(12) United States Patent
Larsson et al.

(10) Patent No.: US 11,601,847 B2
(45) Date of Patent: Mar. 7, 2023

(54) AGENT, SERVER, CORE NETWORK NODE AND METHODS THEREIN FOR HANDLING AN EVENT OF A NETWORK SERVICE DEPLOYED IN A CLOUD ENVIRONMENT

(71) Applicant: Telefonaktiebolaget LM Ericsson (publ), Stockholm (SE)

(72) Inventors: Conny Larsson, Åkersberga (SE); Michael Eriksson, Sollentuna (SE); Zhang Fu, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/954,495

(22) PCT Filed: Dec. 21, 2017

(86) PCT No.: PCT/SE2017/051332
§ 371 (c)(1),
(2) Date: Jun. 16, 2020

(87) PCT Pub. No.: WO2019/125258
PCT Pub. Date: Jun. 27, 2019

(65) Prior Publication Data
US 2021/0092639 A1 Mar. 25, 2021

(51) Int. Cl.
*H04W 28/08* (2009.01)
*H04L 67/1008* (2022.01)

(52) U.S. Cl.
CPC ......... *H04W 28/08* (2013.01); *H04L 67/1008* (2013.01)

(58) Field of Classification Search
CPC ............... H04W 28/08; H04L 67/1008; H04L 41/0816; H04L 41/084; H04L 41/0896;
(Continued)

(56) References Cited

U.S. PATENT DOCUMENTS 8,447,851 B1 * 5/2013 Anderson ........... G06F 11/3082
709/223
9,652,277 B2 * 5/2017 Broustis .............. H04L 41/0896
(Continued)

FOREIGN PATENT DOCUMENTS

CN 103038652 A 4/2013
CN 104685935 A 6/2015
(Continued)

OTHER PUBLICATIONS

Nikkhouy, "Monitoring Service Chains in the Cloud", University of Helsinki, May 2016.*
(Continued)

*Primary Examiner* — Todd L Barker
(74) *Attorney, Agent, or Firm* — Nicholson De Vos Webster & Elliott LLP

(57) ABSTRACT

A method performed by an agent for handling an event of a network service deployed in a cloud environment is provided. The agent is capable to access to a server in the cloud environment. The agent obtains information from the server. The information is about an event of the network service. When the network service relates to a Third Generation Partnership Project (3GPP) network, the agent decides whether to register network service with or without an associated address of a load balancer of the network service. The agent then registers in a core network node operating in the 3GPP network, the network service with or without an associated address of a load balancer of the network service according to the event and according to the outcome of the deciding.

18 Claims, 18 Drawing Sheets

(58) Field of Classification Search
CPC ......... H04L 41/12; H04L 41/28; H04L 45/74; H04L 67/1031; H04L 67/142; G06F 9/45558; G06F 2009/45562; G06F 2009/4557

See application file for complete search history.

(56) References Cited

U.S. PATENT DOCUMENTS

| | | | |
|---|---|---|---|
| 9,730,156 B1* | 8/2017 | Chamarty | H04W 52/0225 |
| 9,749,174 B1 | 8/2017 | Goff et al. | |
| 10,268,514 B1* | 4/2019 | Kesarwani | G06F 9/5077 |
| 10,341,905 B2* | 7/2019 | Teyeb | H04W 36/0022 |
| 2003/0126241 A1* | 7/2003 | Nagura | H04L 61/45 707/999.107 |
| 2006/0150191 A1* | 7/2006 | Masuda | G06F 11/3495 718/105 |
| 2007/0208844 A1* | 9/2007 | Armstrong | H04L 67/01 709/223 |
| 2014/0064099 A1* | 3/2014 | Kuroda | H04L 67/1008 370/236 |
| 2014/0086177 A1 | 3/2014 | Adjakple et al. | |
| 2014/0101226 A1* | 4/2014 | Khandekar | H04L 67/1031 709/203 |
| 2015/0103780 A1 | 4/2015 | Kaippallimalil et al. | |
| 2015/0117306 A1* | 4/2015 | Das | H04M 1/576 370/328 |
| 2016/0014825 A1* | 1/2016 | Kim | H04W 76/27 370/329 |
| 2016/0100330 A1* | 4/2016 | Broustis | H04W 24/02 370/237 |
| 2016/0337329 A1* | 11/2016 | Sood | H04L 63/06 |
| 2016/0353498 A1* | 12/2016 | Enomoto | H04W 76/27 |
| 2017/0346704 A1 | 11/2017 | Strijkers et al. | |
| 2018/0191561 A1* | 7/2018 | You | G06F 9/45558 |
| 2018/0227842 A1* | 8/2018 | Chandramouli | H04W 8/065 |
| 2018/0368047 A1* | 12/2018 | Patil | H04L 45/24 |
| 2019/0075452 A1* | 3/2019 | Avula | H04W 8/245 |
| 2020/0404011 A1* | 12/2020 | Gervais | H04L 63/1425 |
| 2021/0014734 A1* | 1/2021 | Liu | H04W 28/0942 |
| 2021/0120473 A1* | 4/2021 | Yao | H04W 36/30 |

FOREIGN PATENT DOCUMENTS

| | | |
|---|---|---|
| CN | 105612508 A | 5/2016 |
| CN | 107209694 A | 9/2017 |
| EP | 2577332 B1 | 9/2016 |
| WO | 2008/116502 A1 | 10/2008 |

OTHER PUBLICATIONS

Point; "Deliverable D3:2 Analysis of horizontal tagets for functional convergence", Apr. 30, 2015.*

5Gpagoda, "D3.1—Slice Components Design—ver. 1.0", Aug. 5, 2017.*

Trivisonno et al., "Network Slicing for 5G Systems,", 2017 IEEE Conference on Standards for Communications and Networking, Sep. 2017, IEEE Publishing.*

Vamshi et al., "Prototyping and Load Balancing the Service Based Architecture of 5G Core Using NFV", 2019 IEEE Conference on Network Softwarization (NetSoft), Jun. 2019.*

Wang et al., "Carrier Load Balancing and Packet Scheduling for Multi Carrier Systems", IEEE Transactins on Wireless Communications, vol. 9, Issue: 5, May 2010.*

Carella et al., Cloudified IP Multified Subsystem (IMS) for Network Function Virtualization (NFV) based architectures, 2014 IEEE Symposiium on Computers and Communications (ISCC), Jun. 23, 2014.*

International Search Report and Written Opinion for International Application No. PCT/SE2017/051332, dated May 22, 2018, 17 pages.

3GPP TS 23.501 V1.5.0, "3rd Generation Partnership Project; Technical Specification Group Services and System Aspects; System Architecture for the 5G System; Stage 2 (Release 15)," Nov. 2017, 170 pages, 3GPP Organizational Partners.

3GPP TS 23.502 V1.3.0, "3rd Generation Partnership Project; Technical Specification Group Services and System Aspects; Procedures for the 5G System; Stage 2 (Release 15)," Nov. 2017, 215 pages, 3GPP Organizational Partners.

Uppal et al., "OpenFlow Based Load Balancing," 2010, 7 pages, CSE561: Networking Project Report, University of Washington.

"SDN architecture," Jun. 2014, 68 pages, ONF TR-502, Issue 1, Open Networking Foundation.

Nokia et al., "Updates on Control plane interconnection model with a data layer," Nov. 14-18, 2016, 20 pages, SA WG2 Meeting #118, S2-166577, Reno, Nevada.

Communication pursuant to Article 94(3) EPC, EP App. No. 17828800.7, dated Jul. 28, 2021, 5 pages.

International Preliminary Report on Patentability for International Application No. PCT/SE2017/051332, dated Jul. 2, 2020, 14 pages.

First Office Action, CN App No. 201780098286.3, dated Nov. 24, 2022, 10 pages of Original Document Only.

* cited by examiner

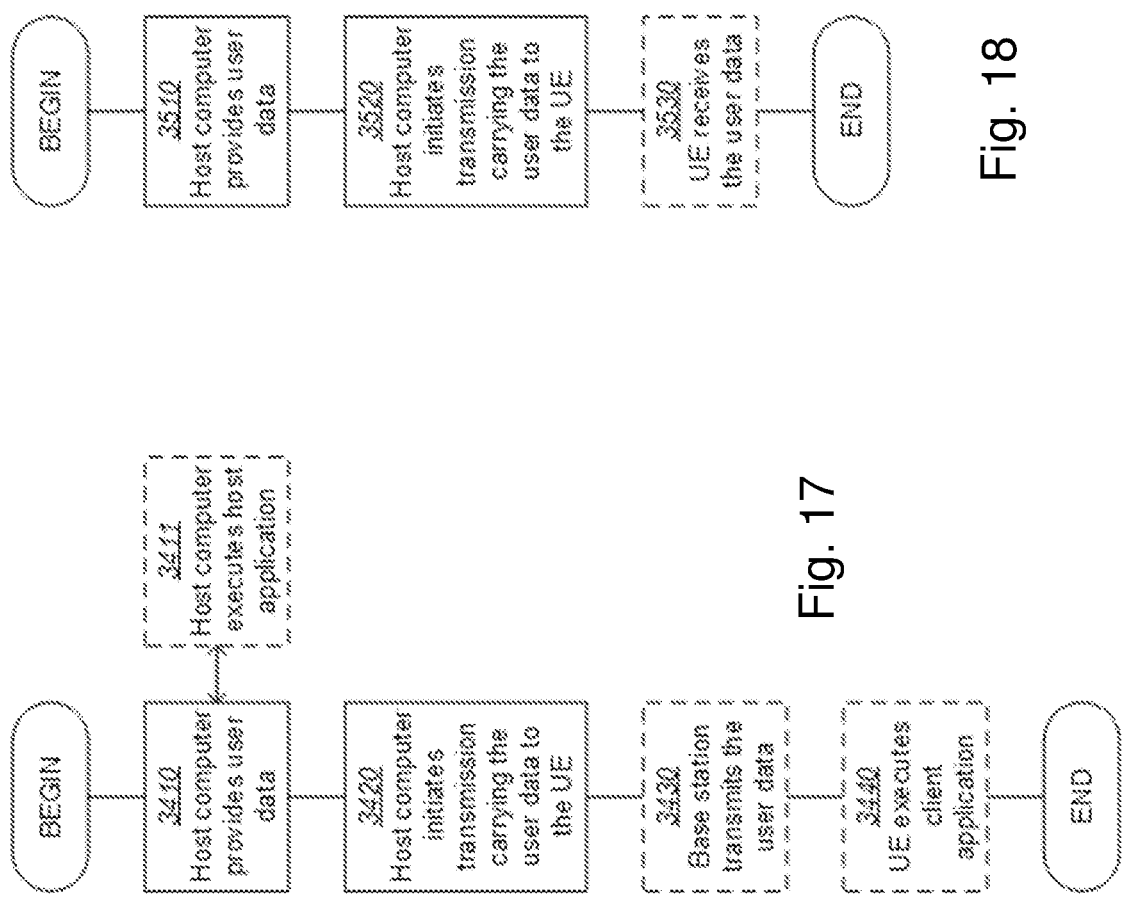

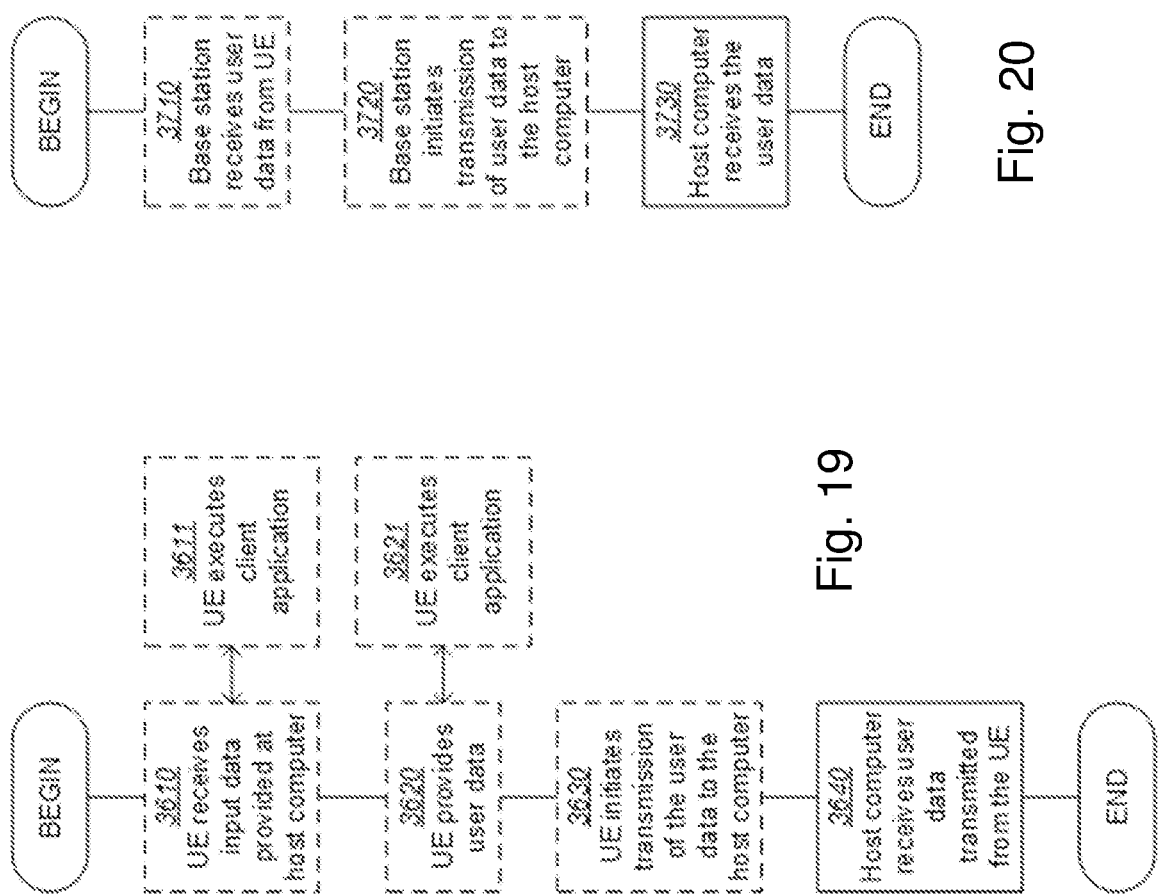

AGENT, SERVER, CORE NETWORK NODE AND METHODS THEREIN FOR HANDLING AN EVENT OF A NETWORK SERVICE DEPLOYED IN A CLOUD ENVIRONMENT

CROSS-REFERENCE TO RELATED APPLICATIONS

This application is a National stage of International Application No. PCT/SE2017/051332, filed Dec. 21, 2017, which is hereby incorporated by reference.

TECHNICAL FIELD

Embodiments herein relate to an agent, a server, a core network node and methods therein. In particular, they relate to handling an event of a network service deployed in a cloud environment.

BACKGROUND

In a typical wireless communication network, wireless devices, also known as wireless communication devices, mobile stations, Stations (STA) and/or user equipments (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as New Radio (NR) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel Such systems and/or related techniques are commonly referred to as MIMO.

In the current 3GPP specification for 5G core network, 5G System architecture is defined to support data connectivity and services enabling deployments to use techniques such as e.g. Network Function Virtualization and Software Defined Networking. It has been identified that the 5G System architecture shall leverage service-based interactions between Control Plane (CP) Network Functions (NFs). Processing functions has been adopted in 5G comprising both functional behavior and interface. An NF may be implemented as a network element on a dedicated hardware, as a software instance running on a dedicated hardware, or as a virtualized function instantiated on an appropriate platform, such as e.g., a cloud infrastructure. FIG. 1 shows a basic Service Based Architecture (SBA) of the core network of 5G. The 5G architecture comprises NFs and reference points that connect NFs. A UE may be connected to any of a RAN, an Access Network (AN) and an Access and Mobility Function (AMF). The RAN may be represented by a base station using a new Radio Access technology (RAT) and an evolved LTE while an AN may be represented by a general base station comprising non-3GPP access, such as e.g., Wi-Fi. The 5G core network comprises of various NFs. In FIG. 1, there are seven 5G core NFs, AMF, Session Management Function (SMF), Policy Control Function (PCF), Application Function (AF), Authentication Server Function (AUSF), User Plane Function (UPF), User Data Management (UDM), Slice Selection Function (NSSF), Network Exposure Function (NEF), and NF Repository Function (NRF).

The NFs expose their abilities as services that may be used by other NFs. For example, AMF may provide a service that enables an NF to communicate with a UE and/or the Access Network (AN) through the AMF, and SMF exposes service that allows the consumer NFs to handle the PDU sessions of UEs.

NFs expose their services by registering themselves to the NRF. NRF also offers service discovery to enable NFs to find each other.

In order to achieve load balancing and fault tolerance in communications, each NF may have multiple instances deployed. It has been defined that each NF instance registers itself to the NRF, the NRF may then perform load balancing for the service requests to the same type of service.

Load balancing improves the distribution of workloads across multiple computing resources, such as computers, a computer cluster, network links, central processing units, or disk drives. Load balancing aims to optimize resource use, maximize throughput, minimize response time, and avoid overload of any single resource. Using multiple components with load balancing instead of a single component may increase reliability and availability through redundancy.

Another related background is Software Defined Networking (SDN). SDN separates the software part and the hardware part in the network elements of 5G, e.g. routers and switches, in order to simplify the network maintenance and accelerate the development of new network applications.

An example of an SDN architecture is shown in FIG. 2, from technical report SDN Architecture 1.0 by Open Networking Foundation. Mostly, network elements do not have to implement routing protocols such as e.g. BGP, OSPF, RIP, or protocols of layer 2 of OSI. Instead, they just forward packets according to flows rules set by a SDN controller.

For example, a simple rule from the SDN controller to a specific network element may be that all the Transmission Control Protocol (TCP) packets that are received from interface A should be sent out through interface B. In such case, when the network element receives a TCP packet from its network interface A, it will forward the packets to its interface B.

The SDN controller needs to know configurations and physical connections of SDN switches, as well as some internal status of the SDN switches. On the other hand, the SDN switches need the flow rules from the SDN controller. These are performed via exchanging messages through an SDN southbound interface or southbound protocol. One example of the southbound protocol is Openflow.

Problems with Existing Solutions

Since nowadays, most of the cloud platforms e.g. openstack, kubernetes, AWS, Azure offers services for load balancing among a set of application instances as well as automatically scaling up/down. One design principle for SBA is to support NF virtualization and cloud deployment to leverage the advantages that the cloud platform provides.

A problem is that cloud platforms are mostly designed for general purposes and lack of 3GPP awareness.

SUMMARY

It is an object of embodiments herein to improve the performance of a 3GPP network using network services in a cloud environment.

According to a first aspect of embodiments herein, the object is achieved by a method performed by an agent for handling an event of a network service deployed in a cloud environment. The agent is capable to access to a server in the cloud environment. The agent obtains information from the server. The information is about an event of the network service. When the network service relate to a Third Generation Partnership Project, 3GPP, network, the agent decides whether to register network service with or without an associated address of a load balancer of the network service. The agent then registers in a core network node operating in the 3GPP network, the network service with or without an associated address of a load balancer of the network service according to the event and according to the outcome of the deciding.

According to a second aspect of embodiments herein, the object is achieved by a method performed by a server operating in a cloud environment for assisting an agent in handling an event of a network service deployed in the cloud environment. The server determines that an event of the network service occurs. The server sends information to the agent. The information is about the event of the network service. The server sends further information to the agent. The further information comprises any one or more out of: address of a load balancer of the network service, processing power of the network service, processing power of respective one or more service instances of the service, and addresses of the one or more respective service instances of the network service 140.

According to a third aspect of embodiments herein, the object is achieved by a method performed by a core network node operating in a Third Generation Partnership Project, 3GPP, network for handling an event of a network service deployed in a cloud environment. The core network node receives from an agent 115, a registration of a network service 140 according to an event. The network service 140 relate to the 3GPP network 100. The network service is to be registered in the core network node with or without an associated address of a load balancer of the network service according to a decision by the agent.

According to a fourth aspect of embodiments herein, the object is achieved by an agent for handling an event of a network service deployed in a cloud environment. The agent is capable to access to a server in the cloud environment. The agent is configured to:

obtain from the server, information about an event of the network service, when the network service relate to Third Generation Partnership Project, 3GPP, network, decide whether to register network service with or without an associated address of a load balancer of the network service, and register in a core network node operating in the 3GPP network, the network service with or without an associated address of a load balancer of the network service according to the event and according to the outcome of the decision.

According to a fifth aspect of embodiments herein, the object is achieved by a server operating in a cloud environment for assisting an agent in handling an event of a network service adapted to be deployed in the cloud environment. The server is configured to:

determine that an event of the network service occurs, send to the agent, information about the event of the network service, send to the agent, information adapted to comprise any one or more out of: address of a load balancer of the network service, processing power of the network service, processing power of respective one or more service instances of the service, and addresses of the one or more respective service instances of the network service.

According to a sixth aspect of embodiments herein, the object is achieved by a core network node operable in a Third Generation Partnership Project, 3GPP, network, for handling an event of a network service deployed in a cloud environment. The core network node is configured to:

receive from an agent in a network node, a registration of a network service according to an event, which the network service is adapted to relate to the 3GPP network, and which network service is to be registered in the core network node with or without an associated address of a load balancer of the network service according to a decision by the agent.

Thanks to that the agent is capable of identify an event related to the network service that is related to the 3GPP network, and register the network service with or without an associated address of a load balancer of the network service in the core network node operating in the 3GPP network, the core network node is made aware of the available network services in the 3GPP network, which may be discovered and used by other components inside or outside 3GPP network. Thus the proposed method fills the deployment gap between the 3GPP network and the potential cloud infrastructure. This results in an improved performance of the wireless communications network.

An advantage of embodiments herein is that they help the network service to register into the core network node e.g. when it is deployed in a cloud environment. They are especially useful when a third party load balancer, which is not defined in 3gpp, is used to balance the request load among network services. This is since third part load balancers are designed for general purposes rather than 3GPP specific, thus are lack of 3GPP procedure awareness.

A further advantage of embodiments herein is that there is no need to change the specification of network services of NF functions defined in 3GPP, neither the cloud environments have to be tailored to support SBA.

The network service and/or instances do not have to know the agent either. So the agent is independent. Embodiments herein close some gap between the cloud infrastructure and the 3GPP SBA.

When the network service and/or its service instances are updated, the load balancer does not have to be redeployed. Its balancing policy or strategy may be updated dynamically.

BRIEF DESCRIPTION OF THE DRAWINGS

Examples of embodiments herein are described in more detail with reference to attached drawings in which:

FIGS. 17 to 20 are flowcharts illustrating methods implemented in a communication system including a host computer, a base station and a user equipment.

DETAILED DESCRIPTION

As part of developing embodiments herein a problem will first be identified and discussed.

Since nowadays, most of the cloud platforms such as e.g. openstack, kubernetes, AWS, and Azure offer services for load balancing among a set of application instances as well as automatically scaling up/down. One design principle for SBA is to support NF virtualization and cloud deployment to leverage the advantages that a cloud platform provides.

However, cloud platforms are commonly designed for general purposes and are not aware of 3GPP or if any services are 3GPP related. Imagine that a couple of NF instances are deployed in Kubernetes, and a load balancer is used which is running as an incoming interface of the NF instances of Kubernetes to distribute the incoming requests to those instances. However, since Kubernetes is not aware of NRF, it will not register the load balancer to the NRF. This results in that these NF instances are not visible to other NFs.

A load balancer when used herein means a program that receives incoming requests for a network service and distributes the requests to one or more corresponding service instances. The load balancer may work in either an Internet protocol (IP) socket layer, e.g. TCP/IP, or application layer, e.g. Hypertext Transfer Protocol (HTTP), or both.

Another problem is the load balancers from the cloud platforms are usually used for general purposes. It is the task of an application developer's to choose appropriate load balancer for the application. Furthermore, if the application, also referred to as service, is updated, the load balancer may also have to be changed, which is not efficient.

Though there are some proposals that use SDN to achieve load balancing, in particular Openflow, comprising that the Openflow switches receive flow rules dynamically and forward the traffic to different servers. However, Openflow only works in the network layer of OSI, it cannot achieve application level load balancing, e.g. HTTP requests.

Embodiments herein relate to a mechanism for assisting in service registration in a core network node in e.g. a 5G service-based core network.

Figure 1:
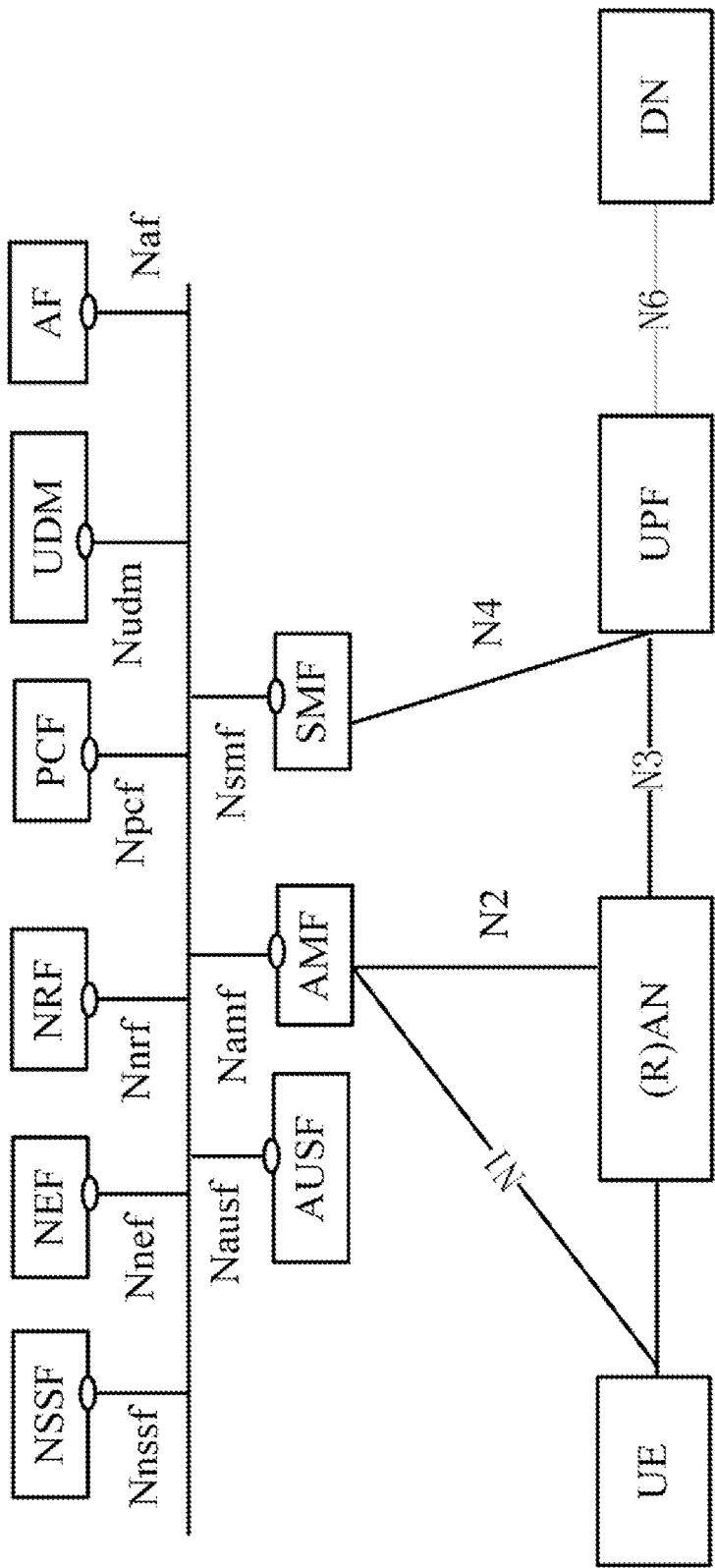
FIG. 1 is a schematic block diagram illustrating prior art.
Figure 2:
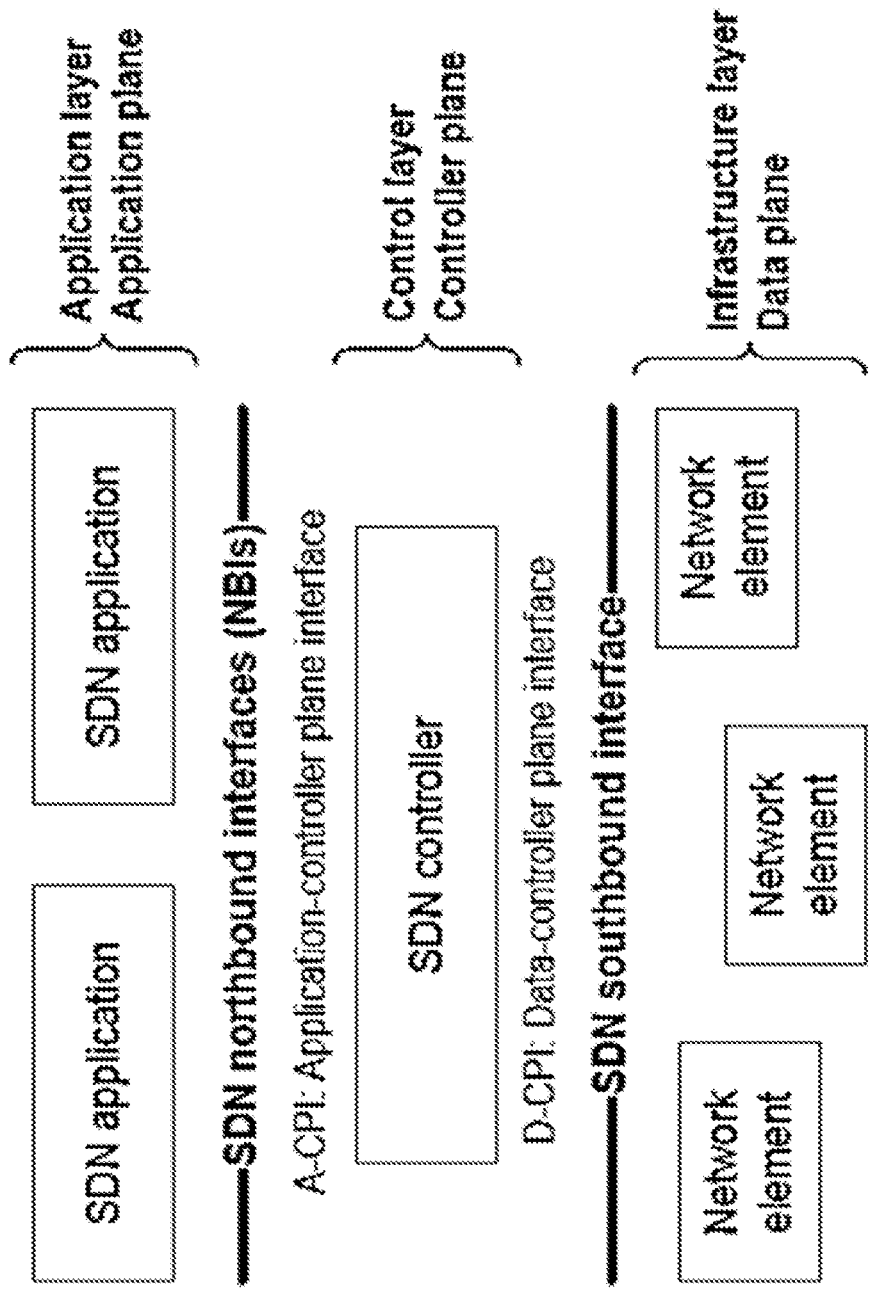
FIG. 2 is a schematic block diagram illustrating prior art.
Figure 3:
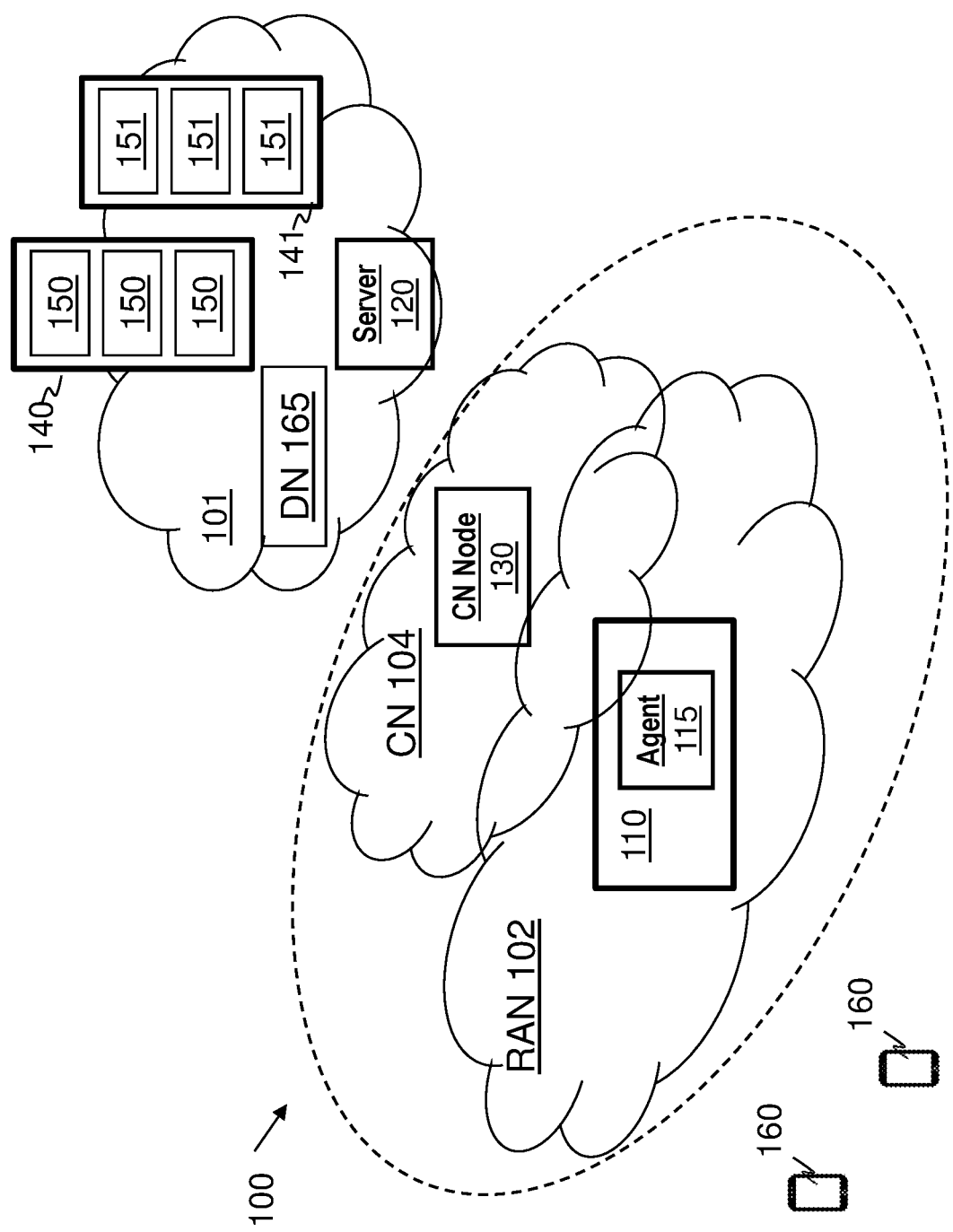
FIG. 3 is a schematic block diagram illustrating embodiments of a wireless communications network.

A 3GPP network 100, in which embodiments herein may be implemented, is schematically illustrated in FIG. 3. The 3GPP network 100 comprises one or more RANs, e.g. a RAN 102, and one or more CNs, e.g. a CN 104. The CN 104 may e.g. be a 5G service-based core network. The 3GPP network 100 is a wireless communications network such as a cellular communications network, and may use a number of different technologies, such as Wi-Fi, LTE, LTE-Advanced, 5G, WCDMA, Global System for Mobile communications/enhanced Data rate for GSM Evolution (GSM/EDGE), NB-IoT just to mention a few possible implementations. Embodiments herein relate to recent technology trends that are of particular interest in a 5G context however, embodiments are also applicable in further development of the existing wireless communication systems such as e.g. GSM, WCDMA and LTE.

FIG. 3 further depicts a cloud environment 101, also referred to as a cloud or a cloud cluster.

One or more network nodes such as e.g. a radio network node 110, operate in the 3GPP network 100, e.g. in the RAN 102. The network node 110 provide radio coverage over a geographical area, which may also be referred to as a cell, a cluster, a beam or a beam group, of a Radio Access Technology (RAT), such as 5G, LTE, Wi-Fi or similar. The network node 110 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a UE within the service area served by the network node 110 depending e.g. on the radio access technology and terminology used.

Other examples of the network node 110 are Multi-Standard Radio (MSR) nodes such as MSR BS, network controllers, Radio Network Controllers (RNCs), Base Station Controllers (BSCs), relays, donor nodes controlling relay, Base Transceiver Stations (BTSs), Access Points (APs), transmission points, transmission nodes, Remote Radio Units (RRUs), Remote Radio Heads (RRHs), nodes in Distributed Antenna System (DAS) etc.

An agent 115 also referred to as a service function operates in or for the network node 110 in the 3GPP network 100. It should be noted that the agent 115 may be deployed as a Virtual Machine (VM) or container in the cloud environment such as a cloud cluster. Alternatively, the agent 115 may be deployed outside the cloud cluster e.g in the network node 110, as long as it can access a server 120 described below such as a cloud API server and a core network node 130 described below such as an NRF.

The agent 115 is capable to access to a server 120 in the cloud environment 101. It should however be noted that the agent 115 may operate in another network node than the network node 110, or the agent 115 may be deployed as a Virtual Machine (VM) or container in a cloud cluster in the cloud environment 101. Alternatively, the agent 115 may also be deployed outside the cloud environment 101 as long as it is capable to access the server 120 in the cloud environment 101 such as e.g. a cloud API server and a core network node such as an NRF. The meaning of the term agent when used herein is an autonomous program that may interact with a cloud management server and the 3GPP network services and functions.

A server 120 operates in the cloud environment 101. The aim of the server 120 is e.g. to manage and orchestrate the VMs, virtual network, and containers that are deployed in the cloud, also provide interfaces that application programs can interact with the cloud for autonomous management, analytics, etc. Thus the server 120 may be an Application Programming Interface (API) server. The agent 115 is capable to access the server 120. The wording "API server" and "cloud API server" when used herein means a server that provides interface for other programs for managing and monitoring the cloud environment.

A core network node 130 operates in the 3GPP network 100, e.g. in the CN 104. The core network node 130 may e.g. be represented by an NRF. E.g. an NRF may operate in the core network node 130. The agent 115 is capable to access the core network node 130 such as its NRF. The aim of the core network node 130 when used herein is to register the network services used in 3GPP network so that they can be discovered and used among each other.

Network services such as the network services 140 and 141 also referred to as NF functions are or will be deployed in the cloud environment 101. Each network service 140 and 141 may comprise respective one or more instances 150 and 151 such as e.g. NF instances. A network service such as the network service 140 may e.g. be an AMF. An instance such as the instance 150 may e.g. be a container or VM running an AMF.

The server 120 keeps track of the network services 140, 141 and their respective instances 150, 151 in the cloud environment 101 e.g. by doing the health probing to check whether the service instances are still alive or functioning properly.

UEs operate in the 3GPP network 100, e.g. one or more UEs 160. Each UE 160 may be any of a mobile station, a non-Access Point (non-AP) STA, a STA, and/or a wireless terminal, and communicate via one or more RANs such as the RAN 102, to one or more CNs such as the CN 104.

It should be understood by the skilled in the art that "UE" is a non-limiting term which means any wireless device, terminal, communications device, wireless communication terminal, user equipment, Machine-Type Communication (MTC) device, Device-to-Device (D2D) terminal, or node e.g. smart phone, laptop, mobile phone, sensor, relay, mobile tablets, an Internet-of-Things (IoT) device, e.g. a Cellular IoT (CIoT) device or even a small base station communicating within a service area. Please note the term user equipment and wireless device used in this document also covers other wireless devices such as Machine-to-Machine (M2M) devices, and IoT devices even though they do not have any user.

Some actions in methods herein are performed by the agent 115 and the core network node 130. As an alternative, any Distributed network Node (DN) 165 and functionality, e.g. comprised in the cloud environment 101, e.g. by the agent 115 and/or and the core network node 130 operating therein may be used for performing these actions.

In some of the network services 140 and 141 load balancers are used. Such a load balancer is running as an incoming interface of the network services 140, 141 and their respective one or more instances 150 and 151 to distribute incoming requests to those network services 140 and 141. However, since the server 120 is not aware of the core network node 130, it will not register the load balancer to the core network node 130. However, according to embodiments herein this will instead be registered by the agent 115 when the network service 140, 141 is 3GPP related which will be described below.

The network service 140, 141 being 3GPP related means that the network service is defined in the 3GPP specifications or technical reports and is used to fulfill some of the network functionality of the mobile network, both in the core network and the user/data plane.

This means that in order to achieve load balancing and fault tolerance in communications, a service consumer which may have access to multiple network services such as e.g. network services 140 and 141 each comprising respective multiple instances deployed such as e.g. instances 150 and 151. Each network service 140, 141 such as each NF instance that has been registered at the core network node 130 e.g. in its NRF may perform load balancing for service requests to the same type of service.

According to some example embodiments herein, the agent 115 registers the load balancer or an entry point for the network service 140 or its instances 150 that are deployed in the cloud environment 101 to the core network node 130 operating in the 3GPP network 100.

The agent 115 may subscribe to events related to the network service 140 such as e.g. deployment events from the server 120 in the cloud environment 101. When an event occurs that relate to the 3GPP network 100, such as e.g. when there are some 3GPP NF instances deployed, the agent 115 decides whether to register the corresponding load balancer (if there is any) to the core network node 130 such as its NRF. E.g. when the network service 140 deployment is scaled up and/or down, the agent 115 will also report such event to the core network node 130 such as its NRF. When all the instances 150 of a network service 140 are shut down, the agent 115 may deregister the service in the core network node 130 such as its NRF.

The agent 115 may also check the status of the load balancer in order to update the registration in the core network node 130 such as its NRF if something happens to the load balancer.

Further, the load balancer may accept the load balancing policies dynamically. The registration agent 115 may send a special kind of message to the load balancer to change balancing policy, or ask the server 120 to do that.

Figure 4:
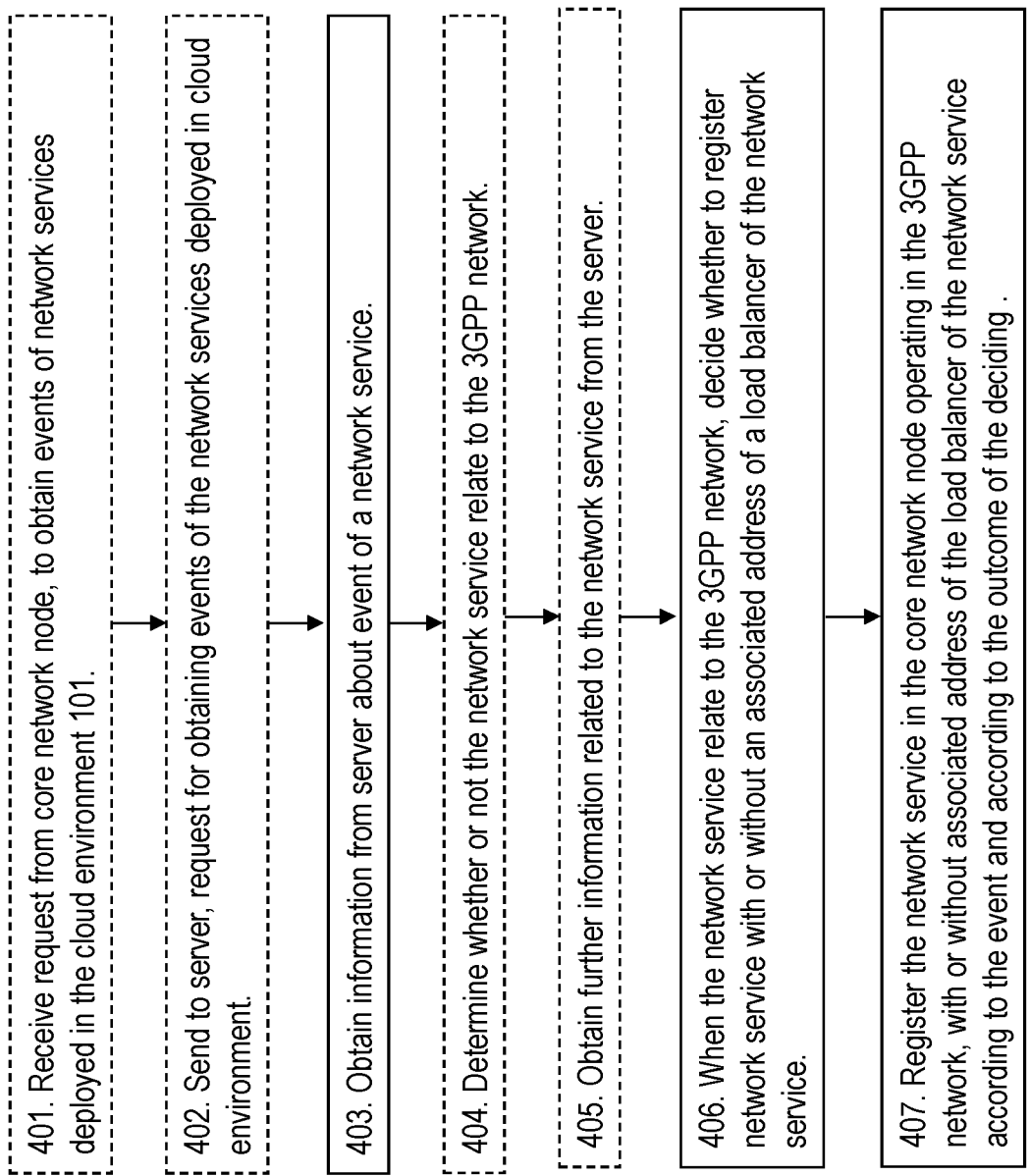
FIG. 4 is a flowchart depicting embodiments of a method in a network node.
Figure 5:
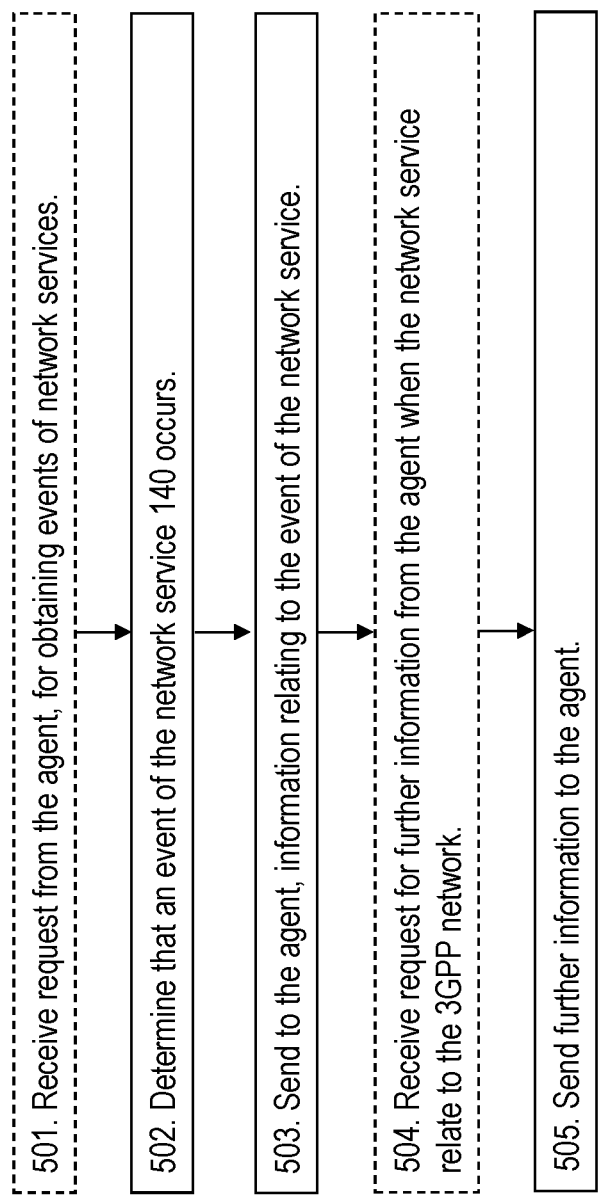
FIG. 5 is a flowchart depicting embodiments of a method in a server.
Figure 6:
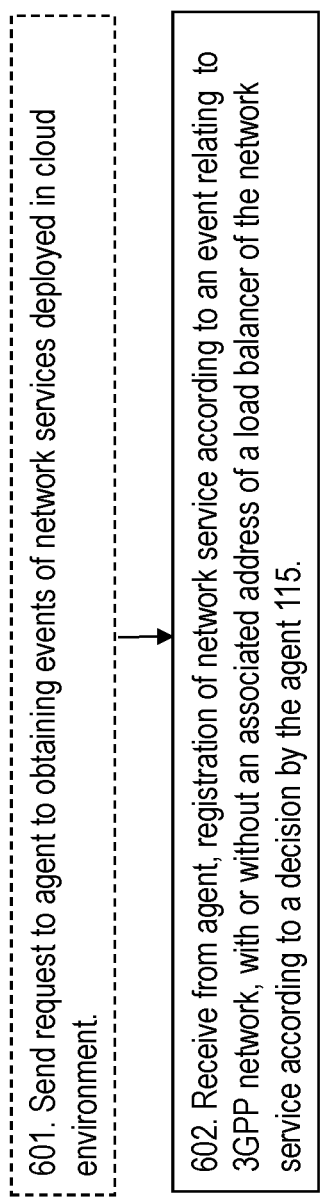
FIG. 6 is a flowchart depicting embodiments of a method in a core network node.

Methods of embodiments herein will first be described in a view seen from the agent 115 together with FIG. 4, followed by a view seen from the server 120 together with FIG. 5, and a view seen from the core network node (130) together with FIG. 6. Then a more detailed description with explanations and examples of the methods will follow.

Example embodiments of a method performed by the agent 115, for handling an event of a network service 140 deployed in a cloud environment 101, will now be described with reference to a flowchart depicted in FIG. 4. The agent 115 is capable to access to the server 120 in the cloud environment 101.

The method comprises the following actions, which actions may be taken in any suitable order. Actions that are optional are presented in dashed boxes in FIG. 4.

Action 401

In some embodiments, the core network node 130 may request the agent 115 to retrieve information of events relating to 3GPP network services deployed in the cloud environment 101. The agent 115 may in these embodiments receive a request from the core network node 130. The request relates to obtaining events of network services 140, 141 deployed in the cloud environment 101. The request may further comprise that when a network service 140, 141 relate to the 3GPP network 100, the agent 115 shall register in the core network node 130, the network service 140, 141 according to the event with or without an associated address of a load balancer of the network service 140, 141.

Action 402

As mentioned above, in some embodiments the agent 115 may subscribe to events related to the network service 140 from the server 120 in the cloud environment 101, such as e.g. deployment events of a network service. In these embodiments, the agent 115 may send to the server 120, a request for obtaining events of the network services 140, 141 deployed in the cloud environment 101. In this way the agent will automatically be updated with new events relating to the network services.

Action 403

The agent 115 obtains information from the server 120. The information is about an event of the network service 140 such as e.g. according to the request sent above.

The event of the network service 140 may comprise any one or more out of: The network service 140 is a new network service starting up in the cloud environment 101, the network service 140 is shut down in the cloud environment 101, a rule of the load balancer of the network service 140 has changed, deployment of the load balancer is changed, e.g. the address of the load balancer is changed or the load balancer is destroyed, a new service instance related to the service 140 is started up or shut down, and a processing power of a service instance related to the service 140 is changed.

Action 404

An aim of the agent 115 is to find new events of the network services that are related to the 3GPP network 100, since agent 115 intend to register these network services in the core network node 130 operating in the 3GPP network 100. The core network node 130 requires these registrations to let other NFs or network services discover the network services 140, 141 and benefit from them. There is no need for the core network node 130 to have other network services than the 3GPP related network services registered. The agent 115 thus determines whether or not the network service 140 relate to the 3GPP network 100 such as e.g. 5G core network. This may be decided by e.g. by image names or tags or description of instance VMs or containers.

Action 405

At registering the network services in the core network node 130 the agent 115 will assign, also referred to as map, some information to the network service related to the obtained information about the event. Therefore, some embodiments, the agent 115 obtains further information from the server 120. The further information may comprise any one or more out of: an address of a load balancer of the network service 140, processing power of the network service 140, processing power of one or more service instances of the service 140, addresses of the one or more respective service instances of the network service 140.

This further information may be obtained by being received automatically by the agent 115, since it may be included in the subscription of events. As an alternative it may be requested by the agent when obtaining the information about the event from the server 120, or when the agent 115 has determined that the network service 140 relate to the 3GPP network 100.

This further information may be obtained together with the first obtained information from the server 120 in action 403. In some embodiments no further information is available when the first information is obtained from the server 120 in action 403. In these embodiments, the further information may be received when it has become available e.g. as a new event being part of the subscription. It may e.g. be obtained on request of the agent 115.

Action 406

When the network service 140 relate to a 3GPP network 100, the agent 115 decides whether to register network service 140 with or without an associated address of a load balancer of the network service 140.

In some example scenarios, the agent 115 decides to register network service 140 with an associated address of a load balancer. This may e.g. be performed when there is a load balancer deployed for the network service instances.

In some alternative example scenarios, the agent 115 decides to register network service 140 without an associated address of a load balancer. This may e.g. be performed when there is no load balancer deployed for that network service.

Action 407

The agent 115 then registers the network service 140 in the core network node 130 operating in the 3GPP network 100. The network service 140 is registered with or without an associated address of the load balancer of the network service 140 according to the event and according to the outcome of the deciding action 406.

In this way, the agent 115 has assisted the core network node 130 to find 3GGP related network services in the cloud environment and register them in the core network node 130.

Example embodiments of a method performed by the server 120 operating in the cloud environment 101 for assisting the agent 115 in handling an event of a network service 140 deployed in the cloud environment will now be described with reference to a flowchart depicted in FIG. 5. The server 120 may e.g. be represented by an API server.

The method comprises the following actions, which actions may be taken in any suitable order. Actions that are optional are presented in dashed boxes in FIG. 5.

Action 501

The server 120 keeps track of any event that occurs of any network service 140, 141 in the cloud environment 101. As mentioned above, in some embodiments the agent 115 may subscribe for new events of network services 140, 141 from the server 120. In these embodiments, the server 120 may receive a request from the agent 115. This request is for obtaining events of network services 140, 141 in the cloud environment 101. This may also comprise events related to any instances of the respective network service 041, 141.

Action 502

The server 120 monitors any events of any network services in the cloud environment 101. However, it should be noted that the server 115 may not be able to separate 3GPP related events from non 3GPP events.

The server 120 thus determines that an event of the network service 140 occurs. This may be performed by monitoring the network services or managing the deployment of the network services. The server 120 may generate such events since it is in the charge of creating and managing the network services in the cloud.

The event of the network service 140, 141 may comprise any one or more out of: The network service 140 is a new network service starting up in the cloud environment 101, the network service 140 is shut down in the cloud environment 101, a rule of the load balancer of the network service 140 has changed, a deployment of the load balancer is changed, e.g. the address of the load balancer is changed or the load balancer is destroyed, a new service instance related to the service 140 is started up or shut down, and a processing power of a service instance related to the service 140 is changed.

Action 503

In an example scenario the server has determined that there is a new event related to the network service 140 and therefore shall inform the agent 115 about this new event. The server 120 then sends information to the agent 115. This information relates to the event of the network service 140.

Action 504

In some embodiments, the server 120 receives a request from the agent 115 when the network service 140 relate to the 3GPP network 100. The request relates to further information comprising any one or more out of: An address of a load balancer of the network service 140, processing power of the network service 140, processing power of respective one or more service instances of the service 140, and addresses of the one or more respective service instances of the network service 140.

This further information may be sent together with the first obtained information from the server 120 in action 503, but in some embodiments it is not included first obtained information. It may e.g. not be available. In these embodiments, the further information may be requested by the agent 115.

Action 505

The server 120 then sends further information to the agent 115. This information comprises any one or more out of: An address of a load balancer of the network service 140, processing power of the network service 140, processing power of respective one or more service instances of the service 140, and addresses of the one or more respective service instances of the network service 140.

As hinted above, this further information may be sent together with the first obtained information from the server 120 in action 503. In some embodiments no further information is available when sending the first information to the agent in action 503. In these embodiments, the further information may be sent when it has become available e.g. as a new event being part of the subscription. It may also be sent on request of the agent 115.

Example embodiments of a method performed by the core network node 130 operating in a 3GPP network 100, for handling an event of a network service 140 deployed in a cloud environment 101 will now be described with reference to a flowchart depicted in FIG. 6.

The method comprises the following actions, which actions may be taken in any suitable order. Actions that are optional are presented in dashed boxes in FIG. 6.

As mentioned above, since the server 120 is not aware of the core network node 130, it will not register the load balancer to the core network node 130. However, according to embodiments herein this will instead be registered by the agent 115 when the network service 140, 141 is 3GPP related.

Action 601

In some embodiments, the core network node 130 may instruct the agent to provide any information and registration of related to new events of any 3GPP related network service 140 in the cloud environment 101. In these embodiments, the core network node 130 may send a request to the agent 115. The request relates to obtaining events of network services 140, 141 deployed in the cloud environment 101. The request further relate to, when a network service 140, 141 relate to the 3GPP network 100, register the network service 140, 141 according to the event with or without an associated address of a load balancer of the network service 140, 141.

Action 602

The core network node 130 receives a registration of a network service 140 from the agent 115. The registration of the network service 140 is according to an event. The network service 140 relates to the 3GPP network 100. The network service 140 is registered with or without an associated address of a load balancer of the network service 140 according to a decision by the agent 115.

In some embodiments, the registration comprises any one or more out of: the address of a load balancer of the network service 140, processing power of the network service 140, processing power of respective one or more service instances of the service 140 and, addresses of the one or more respective service instances of the network service 140.

The event of a network service 140, 141 may comprise any one or more out of: The network service 140 is a new network service starting up in the cloud environment 101, the network service 140 is shut down in the cloud environment 101, a rule of the load balancer of the network service 140 has changed, a deployment of the load balancer is changed, e.g. the address of the load balancer is changed or the load balancer is destroyed, a new service instance related to the service 140 is started up or shut down, and a processing power of a service instance related to the service is changed.

The registration of the network service 140, 141 may e.g. be used to any one or more out of: Make a new service for the 3GPP network 100 deployed in the cloud environment 101 accessible by other services or network functions in the3GPP network 100, and make a new User Plane Function, UPF, deployed in the cloud environment 101 discoverable by the other services or network functions in the3GPP network 100.

In the following, embodiments herein are explained and illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 7:
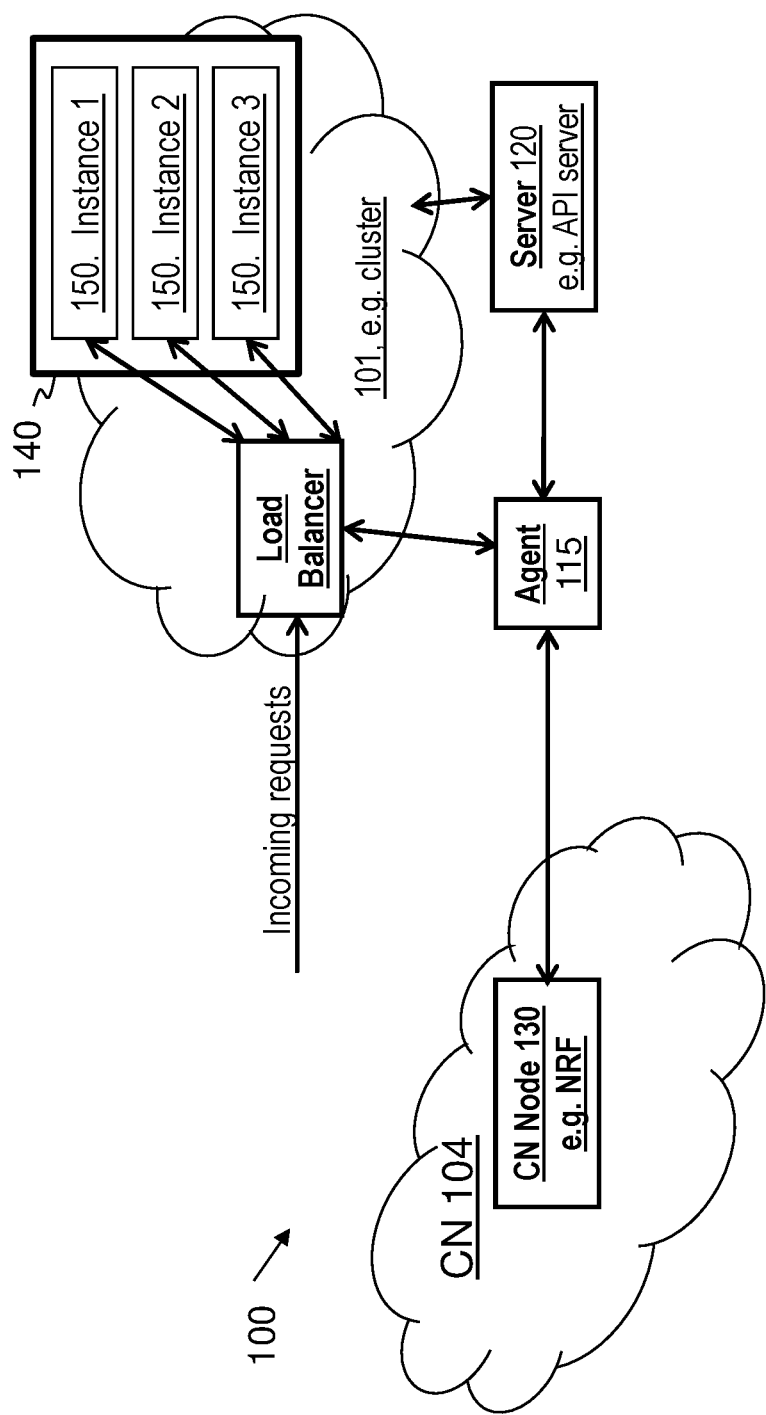
FIG. 7 is a schematic block diagram illustrating embodiments of a wireless communications network.

FIG. 7 illustrates an example scenario of a relation between the agent 115 and other related components.

Most cloud platforms such as e.g. the cloud environment 101, offer APIs for UEs such as the UE 160 to control and maintain their Virtual API VMs and containers in the cloud environment. The wording "cloud platform" when used herein means a system that comprises a set of tools which may be used to build a cloud environment. The wording "cloud environment" when used herein means an environment where the VMs and containers and virtual networks may run on. The wording "cloud cluster" when used herein means a set of physical machines acting as a hardware platform for a cloud environment. For example, some cloud clusters have a master node as the controller to the cloud cluster and the master node is usually acting as an API server.

The agent 115 connects to the server 120, e.g. an API server, and subscribes the events of new network services 140, 141 such as e.g. new VMs or containers starting up.

When new network services 140, 141 start up, the agent 115 will receive these events from the server 120. The agent 120 will then distinguish whether or not the new network service 140, 141 is related to 3GPP e.g. by image names or tags or description of instance VMs or containers. In an example scenario the network service 140 is 3GPP related but the network service 141 is not. The agent 115 may also obtain the information of how many instances 150, 151 of the network service that have been started up, as well as a computation power of each instance, e.g. number of virtual Central Processing Units (vCPUs), memory, etc.

After being informed of an event such as that a new network service 140, 141 has started, the agent 115 may ask the server 120 about information of a corresponding load balancer, if there is any. Then the agent 120 which may comprise a table, may create an entry in its table maintaining the status of the network service 140, 141. Each entry of the table may e.g. include the following information: Name of network service 140, 141, number of instances active, address of the load balancer. This is also referred as further information above.

Then the agent 115 registers this new network service 140 to the core network node 130. It agent decides whether or not send the load balancer address to the core network node 130 for that network service 140. This will be more described below. The load balancer address may e.g. be an IP address or Fully Qualified Domain Name (FQDN) with a port number. Besides the address of the load balancer, the agent 115 may also send the aggregated processing power of the service instances 150 of the network service 140 to the core network node 130.

Figure 8:
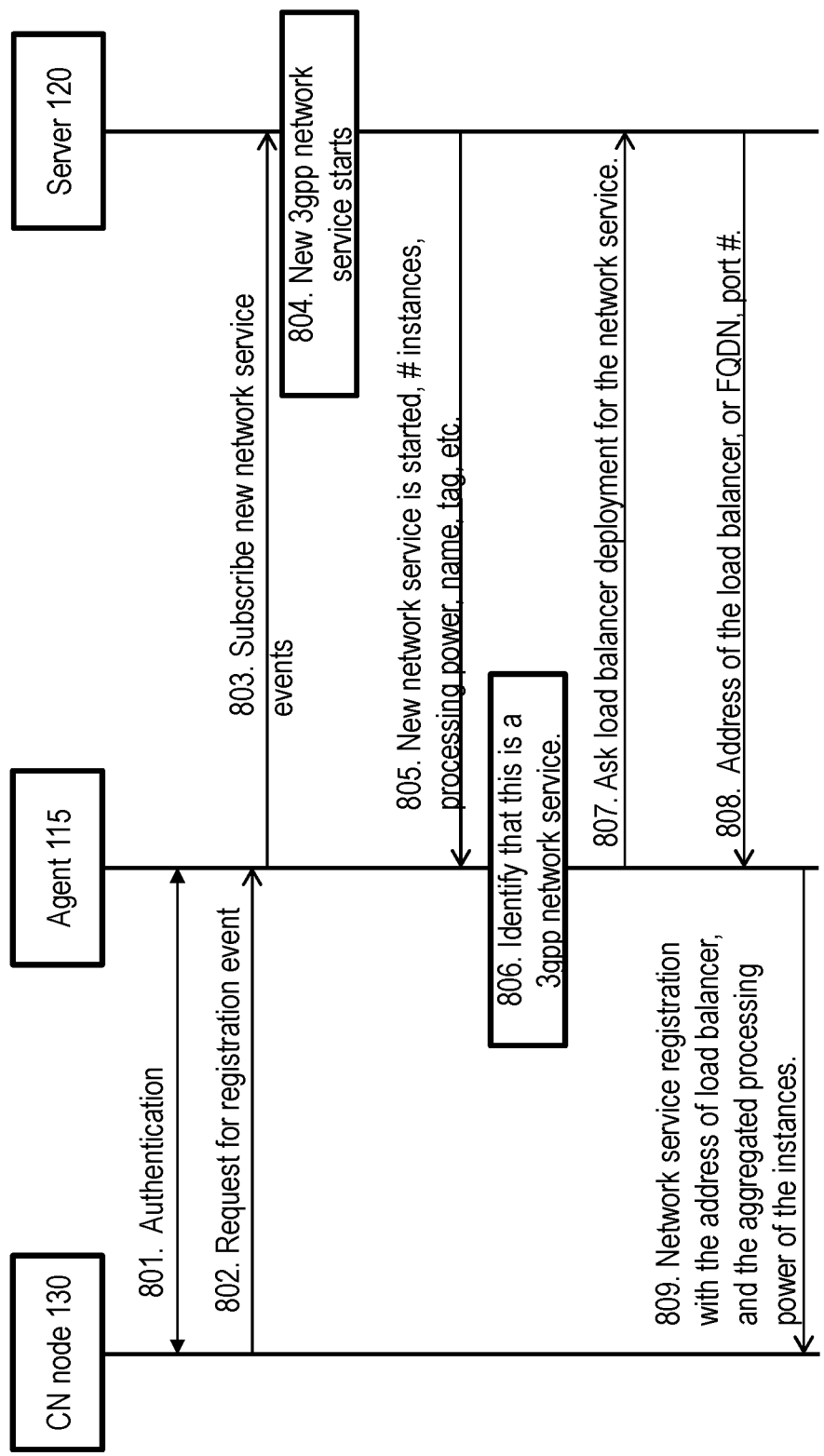
FIG. 8 is a signalling scheme depicting embodiments of a method in a wireless communications network.

FIG. 8 is combined signaling diagram and flowchart depicting an example scenario according to embodiments herein when there is a load balancer deployed for a 3GPP related network service 140.

Action 801. The core network node 130 and the agent 115 performs authentication. This means that the core network node 130 and the agent 115 authenticate to each other and a secure communication channel may be established between them.

Action 802. The core network node 130 requests the agent 115, for registration of events relating to network services 140 related to 3GPP. This action is related to Action 401 and 601.

Action 803. The agent 115 subscribes to new network service 140, 141 events. This action is related to Action 402 and 501.

Action 804. A New 3gpp network service 140 starts. This action is related to Action 502.

Action 805. An event that a new network service 140 is started together with # instances, processing power, name, tag, etc. is sent by the server 120 to the agent 115. This action is related to Action 403, and 503.

Action 806. The agent 115 determines such as e.g. identifies that this is a 3gpp network service 130. This action is related to Action 404.

Action 807. The agent 115 asks the server 120 for load balancer deployment for the network service 140. This action is related to Action 504.

Action 808. The server 120 sends to the agent 115, the address of the load balancer, e.g. FQDN, port #. Since there is a load balancer deployed for the network service 140 with an associated address, the agent 115 decides to register the network service with the associated address of the load balancer of the network service 140. This action is related to Action 405, 406 and 505.

Action 809. The agent registers the network service 140 to the core network node 130 together with the address of the load balancer, and e.g. the aggregated processing power of the instances 150. This action is related to Action 407 and 602.

Action 802 is optional. If there is an action 802, the agent 115 waits for a request from the core network node 130, then subscribes to the events in action 803. If there is no action 802, then the agent 120 may subscribes to the events after a successful authentication to the core network node 130.

Figure 9:
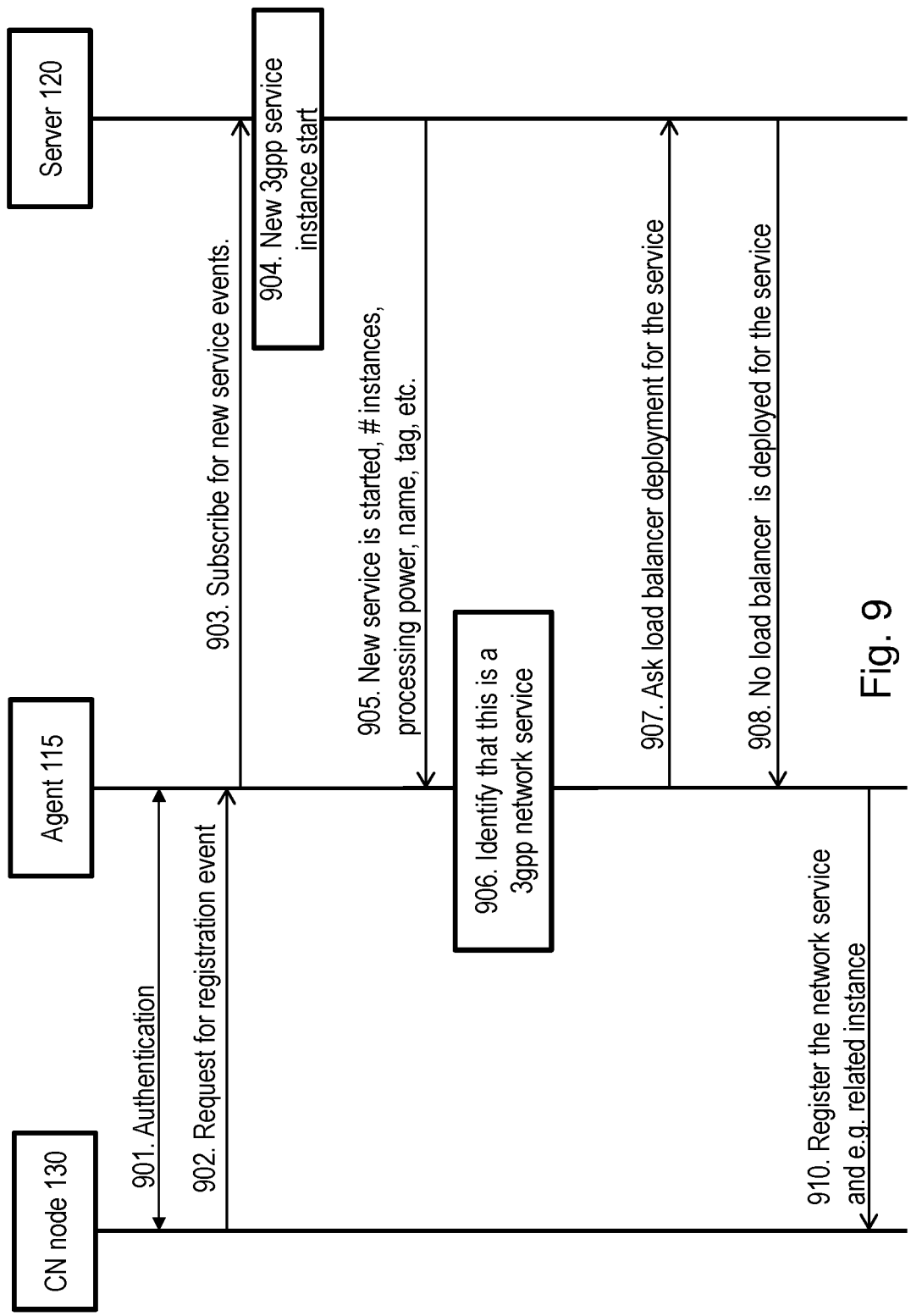
FIG. 9 is a signalling scheme depicting embodiments of a method in a wireless communications network.

FIG. 9 is combined signaling diagram and flowchart depicting another example scenario according to embodiments herein when there is no load balancer deployed for a 3GPP related network service 140, in this scenario the load balancer is deployed at a later point in time.

It is possible that, the network service 140, 141 and/or their respective instances 150, 151 are deployed without a load balancer. In that that case, all the instances 150, 151 deployments may configure a respective public address, that the outside core network 100 may access the instances inside the cloud environment 101. In that case, the network service 140, 141 and/or their respective instances 150, 151 may register themselves to the core network node 110 without any assistance of the agent 115.

Action 901. The core network node 130 and the agent 115 performs authentication.

Action 902. The core network node 130 requests the agent 115, for registration of events relating to network services 140 related to 3GPP. This action is related to Action 401 and 601.

Action 903. The agent 115 subscribes to new network service 140, 141 events. This action is related to Action 402 and 501.

Action 904. A New 3gpp network service 140 starts. This action is related to Action 502.

Action 905. An event that a new network service 140 is started together with the number of instances, processing power, name, tag, etc. is sent by the server 120 to the agent 115. This action is related to Action 403, and 503. Thus in action 905, the server 120 gives the access information of the network service 140 and/or its respective instances 150 to the agent 115.

Action 906. The agent 115 determines such as e.g. identifies that this is a 3gpp network service 130. This action is related to Action 404.

Action 907. The agent 115 asks the server 120 for load balancer deployment for the network service 140. This action is related to Action 504.

Action 908. The server 120 answers to the agent 115, there is no load balancer depoyed for the network service 140 and therefore the agent 115 decides to register the network service without associated address of the load balancer of the network service 140. This action is related to Action 406.

Action 909. The agent registers the network service 140 to the core network node 130 without an address of a load balancer, but maybe together with e.g. the aggregated processing power of the instances 150. This action is related to Action 407.

As in the above scenario, action 9802 is optional. If there is an action 902, the agent 115 waits for a request from the core network node 130, then subscribes to the events in action 903. If there is no action 902, then the agent 120 may subscribes to the events after a successful authentication to the core network node 130.

Figure 10:
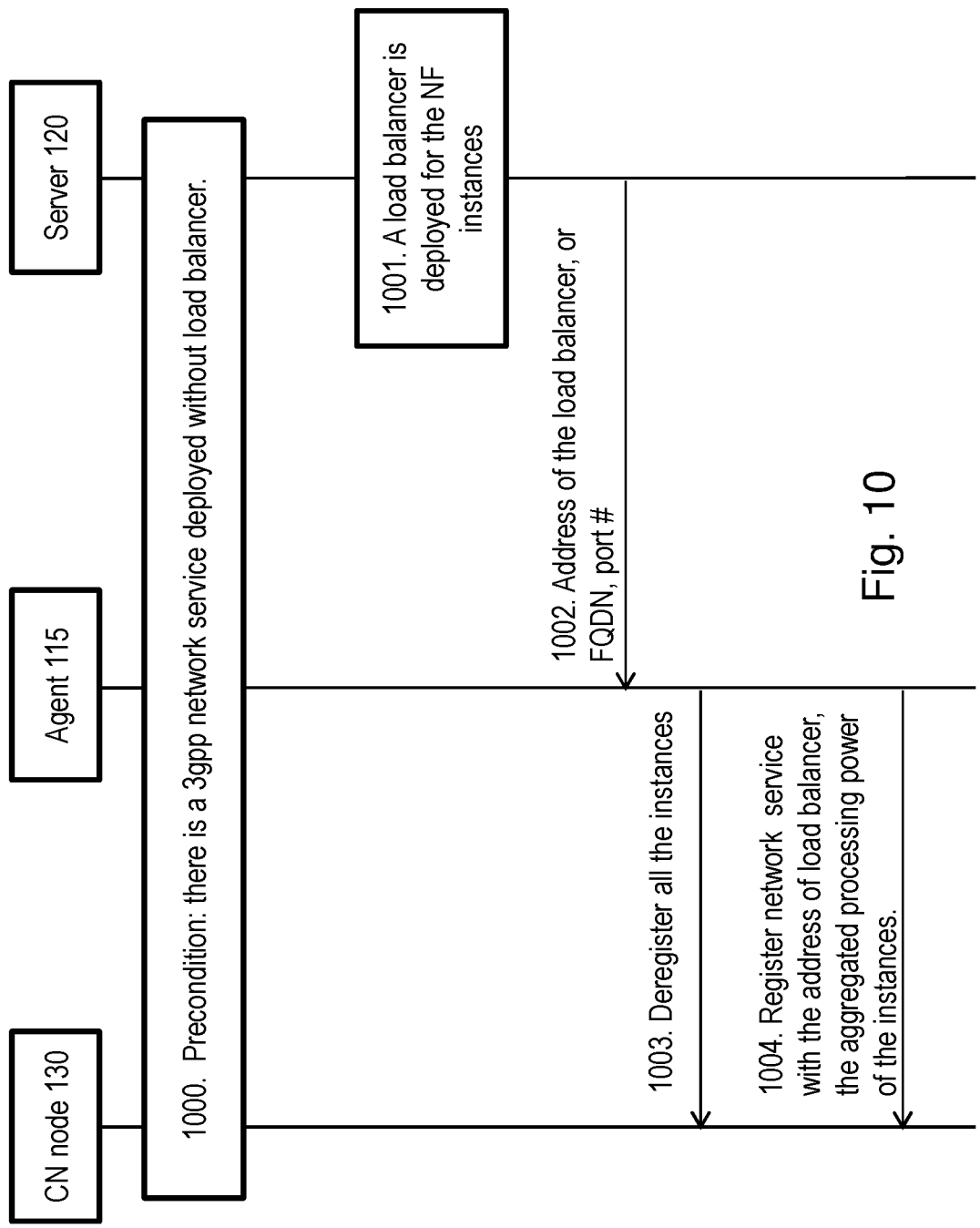
FIG. 10 is a signalling scheme depicting embodiments of a method in a wireless communications network.

FIG. 10 is combined signaling diagram and flowchart depicting another example scenario according to embodiments herein which comprises actions that follows the method in FIG. 9, when there is a load balancer deployed for the service afterward.

Action 1000. The precondition as depicted in Action 909 is that there is a 3GPP network service 140 deployed without a load balancer and this is registered by the agent 115 in the core network node 130.

Action 1001. A load balancer is deployed for the network service 140 and possibly for its instances 150. This is a new event that the agent subscribes for. This action is related to Action 502.

Action 1002. The event of comprising the address of the load balancer such as the or FQDN, port # is sent to the agent 115. This action is related to Action 403, 405 and 503.

Action 1003. The agent 115 may deregister all the instances of the network service 140.

Action 1004. The agent 115 then registers in the core network node 130, the network service 140 together with the address of load balancer, and e.g. the aggregated processing power of the instances. This action is related to Action 407 and 602.

It should be noted that in some embodiments following any embodiment above, the load balancer may be updated at a later point in time, e.g. the address or port number, and that the agent 115 may subscribe such event. In these embodiments the server 120 will send to the agent 115, information that the load balancer is updated or destroyed. In that case, the agent may update the registration of the network service 140 together with the information that the load balancer is updated to the core network node 130 or deregister the load balancer of the network service 140 if it is destroyed.

The agent may keep monitoring the liveness of the network services 140, 141 and their respective one or more instances 150 and 151 through the server 120. Workload information from the network services 140, 141 and their respective one or more instances 150 and 151 may be aggregated by the agent 120 and it may report that to the NRF. Alternatively, a cloud management function e.g. in a core network node such as e.g. an Operation And Management (OAM) node may monitor the load of each network service 140, 141 and their respective one or more instances 150 and 151, and expose it via the server 120, and the agent 115 may obtain such information via its subscription.

The agent 115 may then register the event of configuration changes of the network services 140, 141 and their respective one or more instances 150 and 151. When the configuration of some the network services 140, 141 and their respective one or more instances 150 and 151 are changed, e.g. the # of vCPU, memory are changed or when some of the network services 140, 141 and/or their respective one or more instances 150 and 151 are shut down, the server 120 informs such event to the agent 115. The agent 115 will then update the corresponding registration in the core network node 130. If all the instances of a network service 140, 141 are shut down, the agent 115 may deregister the network service 140, 141 in the core network node 130.

In some embodiments, it is possible to change the load balancer's policy and/or type dynamically. A load balancer's policy when used herein means how the load balancer distributes the requests to the corresponding service instances. For example, the load balancer distributes the requests in a round robin fashion to the service instances, or it may e.g. always give the request to the instance with the least request queue. A load balancer's type when used herein means which network layer that the load balancer works on. For example, a load balancer may work in TCP/IP layer that distributes TCP connections to service instances, or it may work in the application layer and distribute HTTP requests to service instances.

Nowadays, most of the load balancers are doing the balancing in a Transmission Control Protocol (TCP) level, i.e. incoming TCP connections are distributed among the network service instances. Some load balancers also support application level load balancing, e.g. they may distribute Hypertext Transfer Protocol (HTTP) requests to different service instances.

Figure 11:
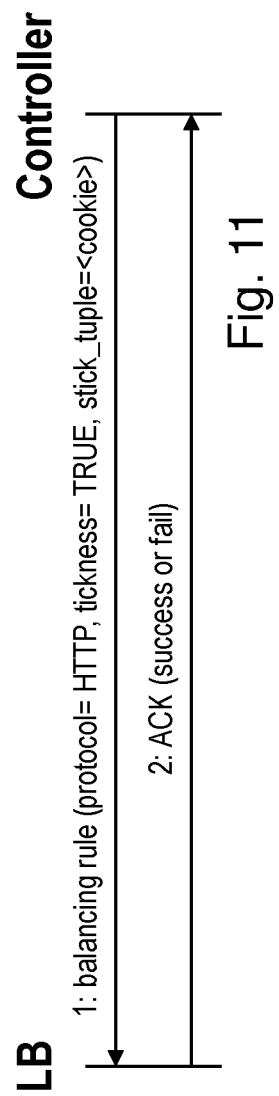
FIG. 11 is a signalling scheme depicting embodiments of a method in a wireless communications network.

FIG. 11 depicts an example of a message type defined for some embodiments herein from a Controller such as e.g. a cloud management function, to the Load Balancer (LB). The controller sends a message comprising e.g. <"balancing rule", "protocol type", "stickiness", "stick_tuple"> to the load balancer to change the balancing policy/type, wherein:

"Balancing rule", may be the message name

"Protocol type", may indicate which protocol layer the load balancer should aim for, e.g. TCP, HTTP.

"Stickiness", may indicate whether stickiness is needed. Stickness when used herein means a binding rule for the requests and the service instances. E.g. TCP connections from the same user device such as UE 160 may always go to the same network service instance 150, 151, or http request with the same cookie may always to go the same network service instance 150, 151.

"Stick_tuple", if stickiness is required, then stick_tuple may indicate which header field should be used for stickness, e.g. it may be source IP if the protocol type is TCP; it may also be HTTP cookie if the protocol type is HTTP. Note that if stickness is false, then stick_tuple may be omitted.

When the of the network services 140, 141 and their respective one or more instances 150 and 151 are updated, e.g. the network service 140, 141 requires stickness on the requests. Then either the cloud management function sends a balancing rule to the corresponding load balancer, or the agent 115 may obtain this information from the event indicating the updates of the of the network services 140, 141 and their respective one or more instances 150 and 151, then the agent 115 may send the balancing rule to the load balancer.

Figure 12:
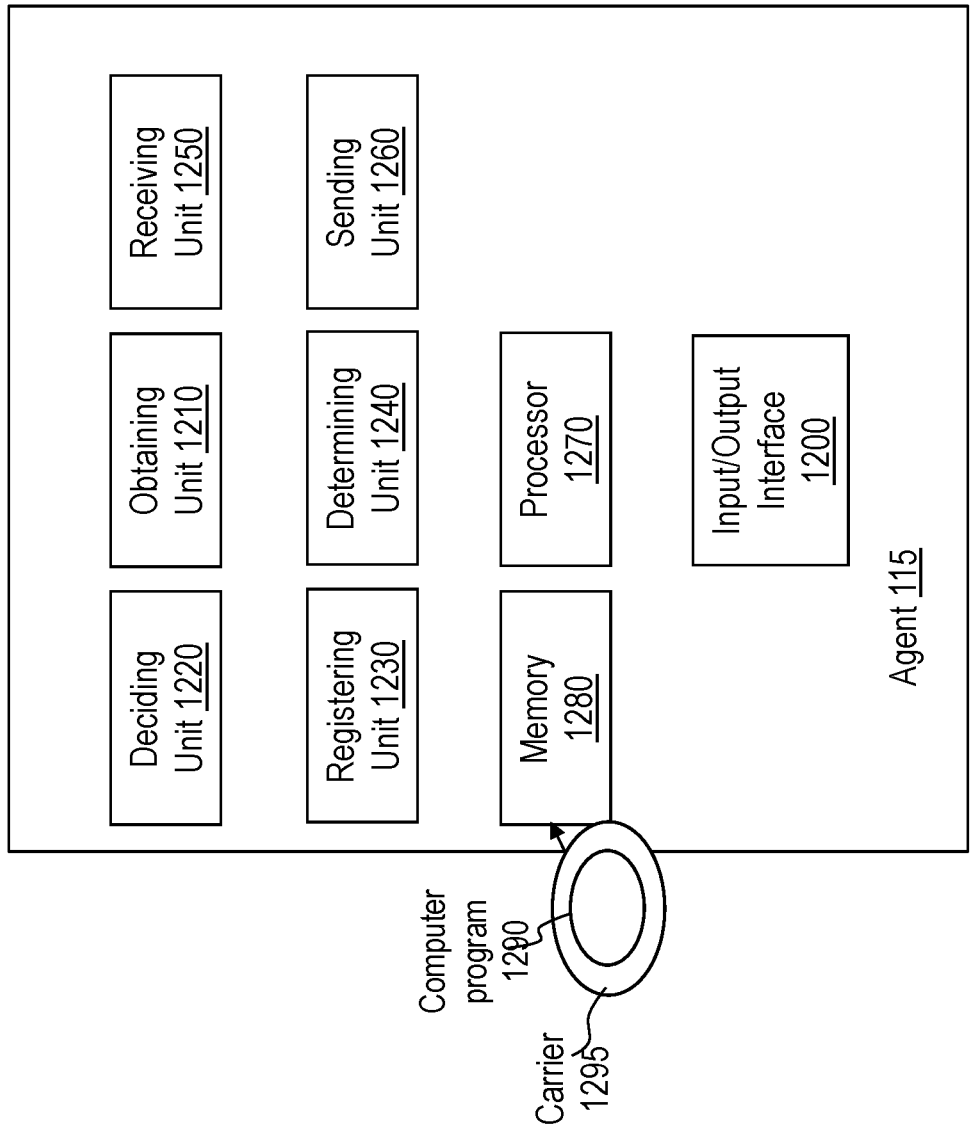
FIG. 12 is a schematic block diagram depicting embodiments of a network node.

To perform the method actions for handling an event of a network service 140 deployed in a cloud environment 101, agent 115 may comprise the following arrangement depicted in FIG. 12. The agent 115 is capable to access to the server 120 in the cloud environment 101.

The agent 115 comprises an input and output interface 1200 configured to communicate e.g. with the server 120 and the core network node 130. The input and output interface 700 may comprise a receiver (not shown) and a transmitter (not shown).

The agent 115 is configured to, e.g. by means of an obtaining unit 1210 configured to, obtain from the server 120, information about an event of the network service 140.

In some embodiments, the agent 115 is configured to, e.g. by means of the obtaining unit 1210 configured to, obtain from the server 120, information comprising any one or more out of: An address of a load balancer of the network service 140, processing power of the network service 140, processing power of one or more service instances of the service 140, addresses of the one or more respective service instances of the network service 140.

The event of the network service 140 may be adapted to comprise any one or more out of: The network service 140 is a new network service starting up in the cloud environment 101, the network service 140 is shut down in the cloud environment 101, a rule of the load balancer of the network service 140 has changed, deployment of the load balancer is changed, a new service instance related to the service 140 is started up or shut down, and a processing power of a service instance related to the service 140 is changed.

The agent 115 is further configured to, e.g. by means of a deciding unit 1220 configured to, when the network service 140 relate to 3GPP network 100, decide whether to register network service 140 with or without an associated address of a load balancer of the network service 140.

The agent 115 is further configured to, e.g. by means of a registering unit 1230 configured to, register in the core network node 130 operating in the 3GPP network 100, the network service 140 with or without an associated address of a load balancer of the network service 140 according to the event and according to the outcome of the decision.

In some embodiments, the agent 115 is further configured to, e.g. by means of a determining unit 1240 configured to, determine whether or not the network service 140 relate to the 3GPP network 100.

In some embodiments, the agent 115 is further configured to, e.g. by means of the receiving unit 1250 configured to, receive from the core network node 130, a request to obtain events of network services 140, 141 deployed in the cloud environment 101, and when a network service 140, 141 relate to the 3GPP network 100, register the network service 140, 141 according to the event with or without an associated address of a load balancer of the network service 140, 141.

In some embodiments, the agent 115 is further configured to, e.g. by means of the sending unit 1260 configured to, send to the server 120, a request for obtaining events of the network services 140, 141 deployed in the cloud environment 101.

Figure 13:
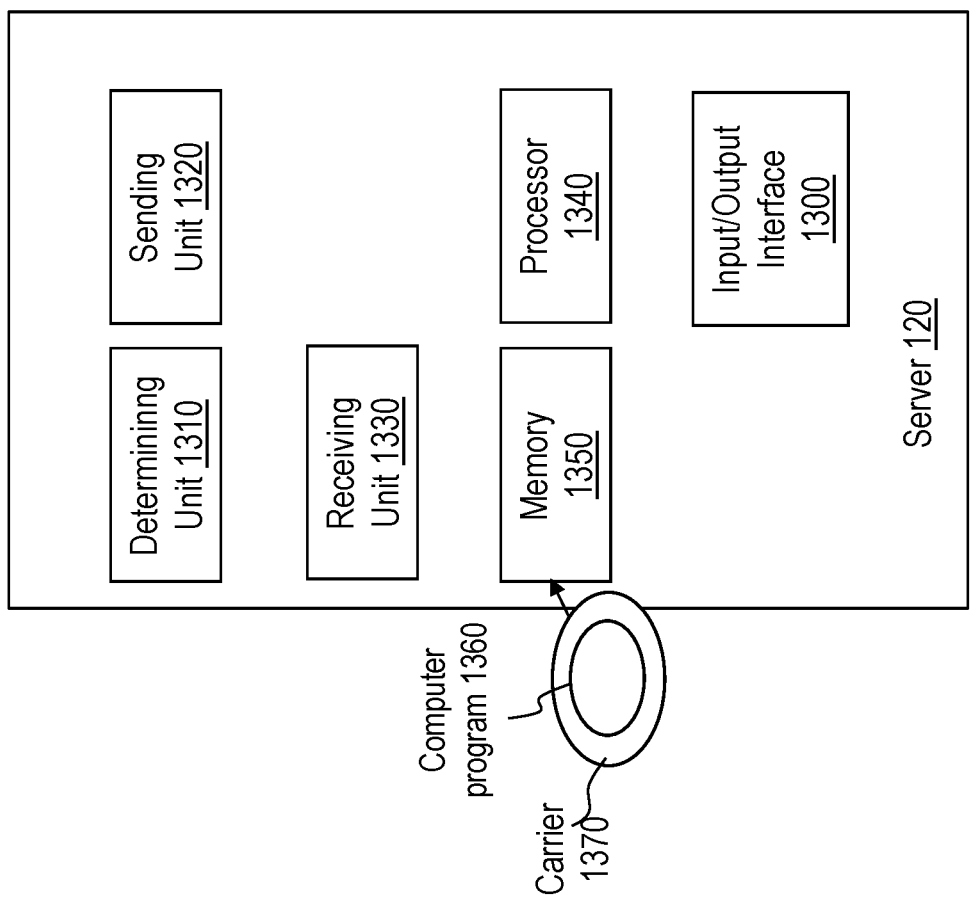
FIG. 13 is a schematic block diagram depicting embodiments of a server.

To perform the method actions for assisting an agent 115 in handling an event of a network service 140 adapted to be deployed in the cloud environment, the server 120, operating in the cloud environment 101, may comprise the following arrangement depicted in FIG. 13. The server 120 may be represented by an API server.

The server 120 comprises an input and output interface 1300 configured to communicate with the agent and one or more network service 140, 141. The input and output interface 1300 may comprise a receiver not shown and a transmitter not shown.

The server 120 is configured to, e.g. by means of a determining unit 1310 configured to, determine that an event of the network service 140 occurs.

The event of a network service 140, 141 may be adapted to comprise any one or more out of: The network service 140 is a new network service starting up in the cloud environment 101, the network service 140 is shut down in the cloud environment 101, a rule of the load balancer of the network service 140 has changed, deployment of the load balancer is changed, a new service instance related to the service 140 is started up or shut down, and a processing power of a service instance related to the service 140 is changed.

The server 120 is further configured to, e.g. by means of a sending unit 1320 configured to, send to the agent 115, information about the event of the network service 140.

The server 120 is further configured to, e.g. by means of the sending unit 1320 further configured to, send to the agent 115, information adapted to comprise any one or more out of: Address of a load balancer of the network service 140, processing power of the network service 140, processing power of respective one or more service instances of the service 140, and addresses of the one or more respective service instances of the network service 140.

The server 120 may further be configured to, e.g. by means of an receiving unit 1330 configured to, when the network service 140 relate to a Third Generation Partnership Project, 3GPP, network 100, receive from the agent 115, a request for information adapted to comprise any one or more out of: An address of a load balancer of the network service 140, processing power of the network service 140, processing power of respective one or more service instances of the service 140, addresses of the respective one or more service instances of the network service 140.

The server 120 may further be configured to, e.g. by means of the receiving unit 1330 further configured to, receive from the agent 115, a request for obtaining events of network services 140, 141.

Figure 14:
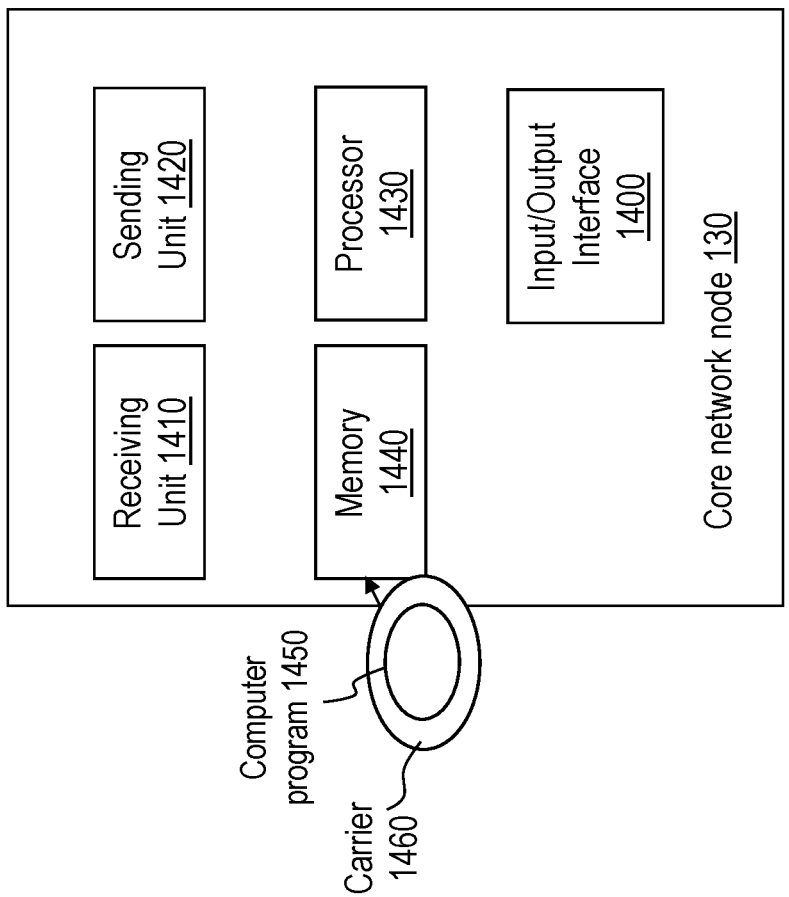
FIG. 14 is a schematic block diagram depicting embodiments of a core network node.

To perform the method actions for handling an event of a network service 140 deployed in a cloud environment 101, core network node 130 operable in a Third Generation Partnership Project, 3GPP, network 100, may comprise the following arrangement depicted in FIG. 14.

The core network node 130 comprises an input and output interface 1400 configured to communicate with the agent 115, and one or more UEs 160. The input and output interface 1400 may comprise a receiver not shown and a transmitter not shown.

The core network node 130 is configured to, e.g. by means of a receiving unit 1410 configured to, receive from an agent 115 in the network node 110, a registration of a network service 140 according to an event. The network service 140 is adapted to relate to the 3GPP network 100, and the network service 140 is to be registered in the core network node 130 with or without an associated address of a load balancer of the network service 140 according to a decision by the agent 115.

The registration may comprise any one or more out of: The address of a load balancer of the network service 140, processing power of the network service 140, processing power of respective one or more service instances of the service 140 and, addresses of the one or more respective service instances of the network service 140.

The core network node 130 may further be configured to, e.g. by means of a sending unit 1420 configured to, send to the agent 115, a request to obtain events of network services 140, 141 deployed in the cloud environment 101, and when a network service 140, 141 relate to the 3GPP network 100, register the network service 140, 141 according to the event with or without an associated address of a load balancer of the network service 140, 141.

The event of the network service 140, 141 may be adapted to comprise any one or more out of: The network service 140 is a new network service starting up in the cloud environment 101, the network service 140 is shut down in the cloud environment 101, a rule of the load balancer of the network service 140 has changed, a deployment of the load balancer is changed, a new service instance related to the service 140 is started up or shut down, and a processing power of a service instance related to the service is changed.

The registration of the network service 140, 141 may be adapted to be used e.g. to any one or more out of: Make a new service for the 3GPP network 100 deployed in the cloud environment 101 accessible by other services or network functions in the3GPP network 100, and make a new User Plane Function, UPF, deployed in the cloud environment 101 discoverable by the other services or network functions in the3GPP network 100.

The embodiments herein for handling an event of a network service 140 deployed in a cloud environment 101, may be implemented through one or more processors, such as e.g. a processor 1270 of a processing circuitry in the agent 110 depicted in FIG. 12, such as e.g. a processor 1340 of a processing circuitry in the server 120 depicted in FIG. 13, and such as e.g. a processor 1430 of a processing circuitry in the radio core network node 130 depicted in FIG. 14, together with computer program code for performing the functions and actions of the embodiments herein. The program code mentioned above may also be provided as a computer program product, for instance in the form of a data carrier carrying computer program code for performing the embodiments herein when being loaded into the radio network node 110. One such carrier may be in the form of a CD ROM disc. It is however feasible with other data carriers such as a memory stick. The computer program code may furthermore be provided as pure program code on a server and downloaded to the respective agent 115, server 120 and core network node 130.

The agent 115, server 120 and core network node 130 may further comprise a respective memory 1280, 1350, 1440 comprising one or more respective memory units. The respective memories 1280, 1350, 1440 comprises instructions executable by the respective processor 1270, 1340, 1430.

The respective memories 1280, 1350, 1440 are arranged to be used to store information about configurations, network services 140, 141, and respective instances 150, 151, registrations, load balancers, updated load balances and applications to perform the methods herein when being executed in the respective agent 115, server 120 and core network node 130.

In some embodiments, a respective computer program 1290, 1360, 1450 comprises instructions, which when executed by the respective processor 1270, 1340, 1430, causes the respective processor 1270, 1340, 1430 to perform the method according to at least any of the respective Actions 401-407, 501-505, and 601-602.

In some embodiments, a carrier 1295 comprises the computer program 1290, a carrier 1370 comprises the computer program 1360 and a carrier 1460 comprises the computer program 1450, wherein the respective carrier 1295, 1370 and 1450 is one of an electronic signal, an optical signal, an electromagnetic signal, a magnetic signal, an electric signal, a radio signal, a microwave signal, or a computer-readable storage medium.

Those skilled in the art will also appreciate that the units in the respective agent 115, server 120 and core network node 130 described above may refer to a combination of analog and digital circuits, and/or one or more processors configured with software and/or firmware, e.g. stored in the respective memories 1280, 1350, 1440, that when executed by the one or more processors such as the respective processor 1270, 1340, 1430 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Further Extensions and Variations

Figure 15:
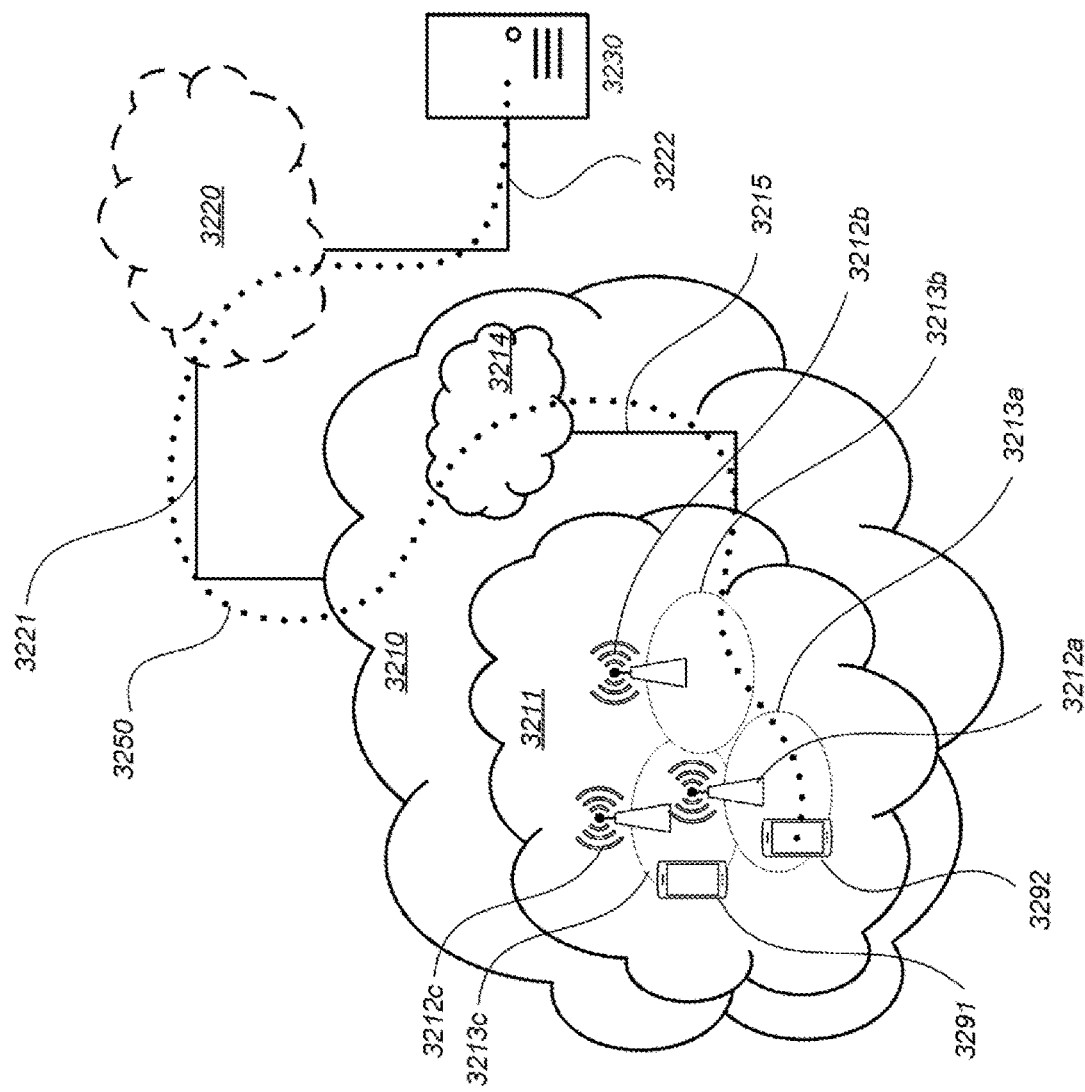
FIG. 15 schematically illustrates a telecommunication network connected via an intermediate network to a host computer.

With reference to FIG. 15, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212*a*, 3212*b*, 3212*c*, such as the network node 110, access nodes, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) e.g. the UE 120 such as a Non-AP STA 3291 located in coverage area 3213*c* is configured to wirelessly connect to, or be paged by, the corresponding base station 3212*c*. A second UE 3292 e.g. the wireless device 122 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 15 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 16. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 16) served by the base station 3320. The communication interface 3326 may be configured to facilitate a connection 3360 to the host computer 3310. The connection 3360 may be direct or it may pass through a core network (not shown in FIG. 16) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 16 may be identical to the host computer 3230, one of the base stations 3212a, 3212b, 3212c and one of the UEs 3291, 3292 of FIG. 15, respectively. This is to say, the inner workings of these entities may be as shown in FIG. 16 and independently, the surrounding network topology may be that of FIG. 15.

Figure 16:
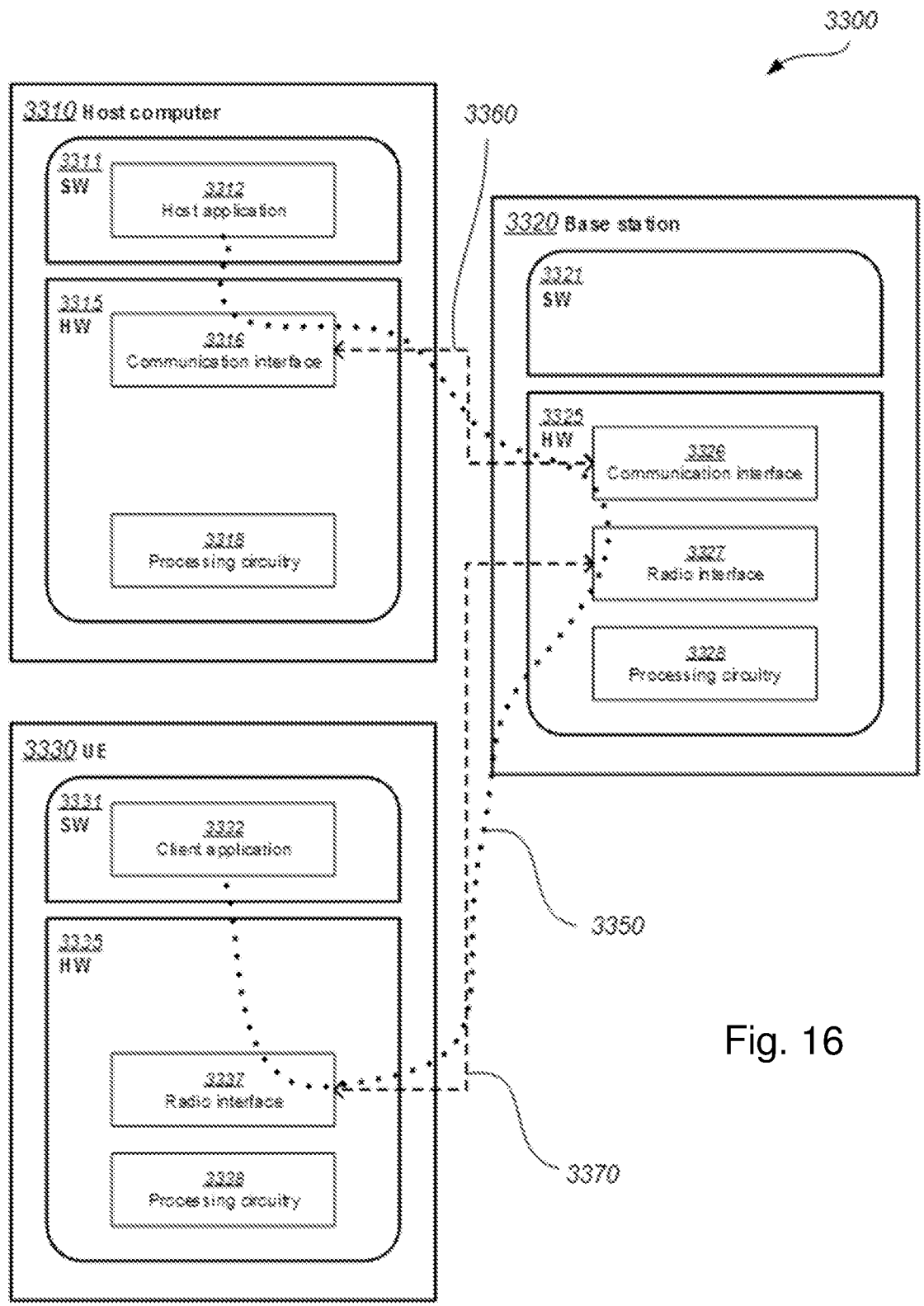
FIG. 16 is a generalized block diagram of a host computer communicating via a base station with a user equipment over a partially wireless connection.

In FIG. 16, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 17 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 17 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 18 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 18 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 19 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 19 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 20 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

What is claimed is:

1. A method performed by an agent for handling an event of a network service deployed in a cloud environment, the method comprising:
   obtaining from a server, information about the event of the network service, wherein the server manages network services in the cloud environment, of which the network service being one of the network services managed by the server, and wherein the server tracks the network services and respective instances of the network services in the cloud environment;
   in response to the network service being related to a network specified by a Third Generation Partnership Project (3GPP) standard, deciding to register the network service in a core network node of a core network that operates within the network specified by the 3GPP standard, along with an address of a load balancer associated with the network service; and
   registering, by the agent, in the core network node of the core network, the network service according to the event, along with the address of the load balancer associated with the network service.

2. The method according to claim 1, further comprising:
   obtaining from the server, information comprising any one or more out of: processing power of the network service, processing power of one or more service instances of the network service, and addresses of the one or more respective service instances of the network service.

3. The method according to claim 1, further comprising:
   receiving from the core network node, a request to obtain events of the network services deployed in the cloud environment.

4. The method according to claim 1, further comprising:
   sending to the server a request for obtaining events of the network services deployed in the cloud environment.

5. A method performed by a core network node of a core network operating within a network specified by a Third Generation Partnership Project (3GPP) standard, for handling an event of a network service deployed in a cloud environment, the method comprising:

receiving from an agent that communicates with a server, information of the network service according to the event, wherein the server manages network services in the cloud environment, of which the network service being one of the network services managed by the server, wherein the server tracks the network services and respective instances of the network services in the cloud environment, and wherein, in response to the network service being related to the network specified by the 3GPP standard, the server provides information about the network service for the event, along with an address of a load balancer associated with the network service, to the agent in order for the agent to register the network service according to the event, along with the address of the load balancer associated with the network service, in the core network node of the core network.

6. The method according to claim 5, wherein registration by the agent further comprises any one or more out of: processing power of the network service, processing power of respective one or more service instances of the network service, and addresses of the one or more respective service instances of the network service.

7. The method according to claim 5, further comprising: sending to the agent, a request to obtain events of the network services deployed in the cloud environment.

8. The method according to claim 5, wherein the event of the network service comprises any one or more out of:
the network service is a new network service starting up in the cloud environment,
the network service is shut down in the cloud environment,
a rule of the load balancer of the network service has changed,
a deployment of the load balancer is changed,
a new service instance related to the service is started up or shut down, and
a processing power of a service instance related to the service is changed.

9. The method according to claim 5, wherein registration of the network service is used for any one or more out of:
make a new service for the network deployed in the cloud environment accessible by other services or network functions in the network, and
make a new User Plane Function (UPF) deployed in the cloud environment discoverable by the other services or network functions in the network.

10. An agent for handling an event of a network service deployed in a cloud environment, the agent comprising:
a processor; and
a memory containing instructions which, when executed by the processor, cause the agent to:
obtain from a server, information about the event of the network service, wherein the server manages network services in the cloud environment, of which the network service being one of the network services managed by the server, and wherein the server tracks the network services and respective instances of the network services in the cloud environment;
in response to the network service being related to a network specified by a Third Generation Partnership Project (3GPP) standard, decide to register the network service in a core network node of a core network that operates within the network specified by the 3GPP standard, along with an address of a load balancer associated with the network service; and
register, by the agent, in the core network node of the core network, the network service according to the event, along with the address of the load balancer associated with the network service.

11. The agent according to claim 10, wherein the agent further is to:
obtain from the server, information comprising any one or more out of: processing power of the network service, processing power of one or more service instances of the network service, and addresses of the one or more respective service instances of the network service.

12. The agent according to claim 10, wherein the agent further is to:
receive from the core network node, a request to obtain events of the network services deployed in the cloud environment.

13. The agent according to claim 10, wherein the agent further is to:
send to the server, a request for obtaining events of the network services deployed in the cloud environment.

14. A core network node of a core network operable within a network specified by a Third Generation Partnership Project (3GPP) standard, for handling an event of a network service deployed in a cloud environment, the core network node comprising:
a processor; and
a memory containing instructions which, when executed by the processor, cause the core network node to:
receive from an agent that communicates with a server, information of the network service according to the event, wherein the server manages network services in the cloud environment, of which the network service being one of the network services managed by the server, wherein the server tracks the network services and respective instances of the network services in the cloud environment, and wherein, in response to the network service being related to the network specified by the 3GPP standard, the server provides information about the network service for the event, along with an address of a load balancer associated with the network service, to the agent in order for the agent to register the network service according to the event, along with the address of the load balancer associated with the network service, in the core network node of the core network.

15. The core network node according to claim 14, wherein registration by the agent further comprises any one or more out of: processing power of the network service, processing power of respective one or more service instances of the network service, and addresses of the one or more respective service instances of the network service.

16. The core network node according to claim 14, further is to:
send to the agent, a request to obtain events of the network services deployed in the cloud environment.

17. The core network node according to claim 14, wherein the event of the network service is to comprise any one or more out of:
the network service is a new network service starting up in the cloud environment,
the network service is shut down in the cloud environment,
a rule of the load balancer of the network service has changed,
a deployment of the load balancer is changed,
a new service instance related to the service is started up or shut down, and a processing power of a service instance related to the service is changed.

18. The core network node according to claim 14, wherein registration of the network service is to be used for any one or more out of:
   make a new service for the network deployed in the cloud environment accessible by other services or network functions in the network, and
   make a new User Plane Function (UPF) deployed in the cloud environment discoverable by the other services or network functions in the network.

* * * * *